(12) United States Patent
Tarsa et al.

(10) Patent No.: US 9,651,740 B2
(45) Date of Patent: May 16, 2017

(54) EXTRACTION FILM FOR OPTICAL WAVEGUIDE AND METHOD OF PRODUCING SAME

(71) Applicant: Cree, Inc., Durham, NC (US)

(72) Inventors: Eric J. Tarsa, Goleta, CA (US); John W. Durkee, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/471,991

(22) Filed: Aug. 28, 2014

(65) Prior Publication Data

US 2015/0192742 A1  Jul. 9, 2015

Related U.S. Application Data

(60) Provisional application No. 61/925,589, filed on Jan. 9, 2014.

(51) Int. Cl.
*G02B 6/34* (2006.01)
*G02B 6/26* (2006.01)
*F21V 8/00* (2006.01)

(52) U.S. Cl.
CPC ............ *G02B 6/34* (2013.01); *G02B 6/0036* (2013.01); *G02B 6/0053* (2013.01); *G02B 6/0065* (2013.01); *G02B 6/26* (2013.01)

(58) Field of Classification Search
CPC .......... G02B 6/34; G02B 6/26; G02B 6/0053; G02B 6/0065
USPC ......................................................... 385/36
See application file for complete search history.

(56) References Cited

U.S. PATENT DOCUMENTS

| | | |
|---|---|---|
| 615,108 A | 11/1898 | De Segundo |
| 766,515 A | 8/1904 | Northrup |
| D67,806 S | 7/1925 | Hoyt et al. |
| 2,043,951 A | 6/1936 | Eksergian |
| 2,992,587 A | 4/1958 | Hicks, Jr. et al. |
| D219,546 S | 12/1970 | Kaiser et al. |
| D298,861 S | 12/1988 | Ewing et al. |
| 4,914,553 A | 4/1990 | Hamada et al. |
| 5,005,108 A | 4/1991 | Pristash |
| 5,309,544 A | 5/1994 | Saxe |
| 5,396,350 A * | 3/1995 | Beeson ............... F21V 5/02 349/62 |
| 5,428,468 A | 6/1995 | Zimmerman et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,555,109 A * | 9/1996 | Zimmerman ............ F21V 5/02 349/112 |
| 5,598,281 A | 1/1997 | Zimmerman et al. |
| 5,624,202 A | 4/1997 | Grierson |
| 5,657,408 A | 8/1997 | Ferm et al. |

(Continued)

FOREIGN PATENT DOCUMENTS

| | | |
|---|---|---|
| DE | 102006009325 | 9/2007 |
| DE | 102006011296 | 9/2007 |

(Continued)

OTHER PUBLICATIONS

European Extended Search Report dated May 19, 2015 for EP Application No. 14192325.0, Applicant, Cree, Inc. (5 pages).

(Continued)

*Primary Examiner* — Thomas A Hollweg
*Assistant Examiner* — Guy Anderson
(74) *Attorney, Agent, or Firm* — McCracken & Gillen LLC

(57) ABSTRACT

An optical waveguide includes a waveguide body and a film disposed on a surface of the waveguide body. The film includes a base and a plurality of undercut light extraction elements disposed between the base and the surface.

20 Claims, 14 Drawing Sheets

(56) References Cited

U.S. PATENT DOCUMENTS

| | | | |
|---|---|---|---|
| 5,771,328 A * | 6/1998 | Wortman | F21V 5/02 349/62 |
| 5,839,823 A | 11/1998 | Hou et al. | |
| 6,002,079 A | 12/1999 | Shin et al. | |
| 6,139,163 A | 10/2000 | Satoh et al. | |
| 6,259,854 B1 | 7/2001 | Shinji et al. | |
| 6,712,481 B2 | 3/2004 | Parker et al. | |
| 6,724,529 B2 | 4/2004 | Sinkoff | |
| 6,752,505 B2 | 6/2004 | Parker et al. | |
| 6,755,556 B2 | 6/2004 | Gasquet et al. | |
| 6,971,758 B2 | 12/2005 | Inui et al. | |
| 6,974,241 B2 | 12/2005 | Hara et al. | |
| 7,001,060 B1 | 2/2006 | Kimura | |
| 7,008,097 B1 | 3/2006 | Hulse | |
| 7,010,212 B2 | 3/2006 | Emmons et al. | |
| 7,021,805 B2 | 4/2006 | Armano et al. | |
| 7,090,389 B2 | 8/2006 | Parker et al. | |
| 7,178,946 B2 | 2/2007 | Saccomanno et al. | |
| 7,182,480 B2 | 2/2007 | Kan | |
| 7,218,830 B2 | 5/2007 | Iimura | |
| 7,290,906 B2 | 11/2007 | Suzuki et al. | |
| 7,322,733 B2 | 1/2008 | Chang et al. | |
| 7,364,342 B2 | 4/2008 | Parker et al. | |
| 7,369,918 B2 | 5/2008 | Cosgrove | |
| 7,416,309 B2 * | 8/2008 | Ko | G02B 6/0056 362/19 |
| 7,455,416 B2 | 11/2008 | Chen | |
| 7,635,193 B2 | 12/2009 | Chang | |
| 7,654,687 B2 | 2/2010 | Tsai et al. | |
| 7,654,719 B2 | 2/2010 | Chang | |
| 7,663,804 B2 | 2/2010 | Chang | |
| 7,695,165 B2 | 4/2010 | Chang | |
| 7,696,531 B2 | 4/2010 | Miyao | |
| 7,703,945 B2 | 4/2010 | Leung et al. | |
| 7,730,967 B2 | 6/2010 | Ballantyne et al. | |
| 7,771,087 B2 | 8/2010 | Wilcox et al. | |
| 7,775,697 B2 | 8/2010 | Hirano et al. | |
| 7,810,949 B2 | 10/2010 | Chang | |
| 7,845,826 B2 | 12/2010 | Aylward et al. | |
| 7,909,496 B2 | 3/2011 | Matheson et al. | |
| 7,914,196 B2 | 3/2011 | Parker et al. | |
| 7,967,492 B2 | 6/2011 | Nagasawa et al. | |
| 8,031,293 B2 | 10/2011 | Lin et al. | |
| 8,033,706 B1 | 10/2011 | Kelly | |
| 8,047,673 B2 | 11/2011 | Santoro | |
| 8,057,056 B2 | 11/2011 | Zhu et al. | |
| 8,061,882 B2 * | 11/2011 | Bita | B82Y 20/00 362/612 |
| 8,070,345 B2 | 12/2011 | Zhang et al. | |
| 8,092,068 B2 | 1/2012 | Parker et al. | |
| 8,212,263 B2 | 7/2012 | Bierhuizen et al. | |
| 8,282,853 B2 | 10/2012 | Mori et al. | |
| 8,283,354 B2 | 10/2012 | Wilson et al. | |
| 8,284,346 B2 | 10/2012 | Park et al. | |
| 8,310,158 B2 | 11/2012 | Coplin et al. | |
| 8,348,489 B2 | 1/2013 | Holman et al. | |
| 8,369,678 B2 | 2/2013 | Chakmakjian et al. | |
| 8,371,735 B2 | 2/2013 | Chen et al. | |
| 8,376,582 B2 | 2/2013 | Catone et al. | |
| 8,384,121 B2 * | 2/2013 | Tischler | H01L 23/4985 257/99 |
| 8,482,186 B2 | 7/2013 | Wang et al. | |
| 8,511,868 B2 | 8/2013 | Haugaard et al. | |
| 8,541,795 B2 | 9/2013 | Keller et al. | |
| 8,564,004 B2 | 10/2013 | Tarsa et al. | |
| 8,591,090 B2 | 11/2013 | Lin | |
| D695,431 S | 12/2013 | Lay | |
| 8,616,746 B2 | 12/2013 | Shinohara | |
| 8,618,735 B2 | 12/2013 | Coplin et al. | |
| D702,377 S | 4/2014 | Lay | |
| 8,696,173 B2 | 4/2014 | Urtiga et al. | |
| 8,702,281 B2 | 4/2014 | Okada et al. | |
| 8,740,440 B2 | 6/2014 | Mizuno et al. | |
| 8,750,671 B1 * | 6/2014 | Kelly | F21V 3/049 362/335 |
| 8,761,565 B1 * | 6/2014 | Coleman | F21K 9/13 362/335 |
| 8,770,821 B2 | 7/2014 | Ijzerman et al. | |
| 8,780,299 B2 | 7/2014 | Ryu et al. | |
| 8,833,996 B2 | 9/2014 | Dau et al. | |
| 8,870,430 B2 | 10/2014 | Kamikatano et al. | |
| 8,948,564 B1 * | 2/2015 | Sherman | F21K 9/135 362/335 |
| 8,950,919 B2 | 2/2015 | Chen | |
| 8,953,926 B1 * | 2/2015 | Kelly | H05B 33/02 362/335 |
| 8,975,827 B2 | 3/2015 | Chobot et al. | |
| 9,046,225 B2 | 6/2015 | Meyers et al. | |
| 9,081,125 B2 | 7/2015 | Dau et al. | |
| 9,086,535 B2 * | 7/2015 | Sherman | G02B 5/128 |
| 9,252,373 B2 * | 2/2016 | Tischler | H01L 23/4985 |
| 2003/0034985 A1 | 2/2003 | Needham Riddle et al. | |
| 2003/0146688 A1 | 8/2003 | Kitazawa et al. | |
| 2004/0146241 A1 | 7/2004 | Deladurantaye et al. | |
| 2005/0024744 A1 | 2/2005 | Falicoff et al. | |
| 2005/0286251 A1 | 12/2005 | Smith | |
| 2006/0018126 A1 | 1/2006 | Choi et al. | |
| 2006/0072203 A1 | 4/2006 | Lee | |
| 2006/0076568 A1 | 4/2006 | Keller et al. | |
| 2006/0146562 A1 * | 7/2006 | Ko | G02B 6/0053 362/561 |
| 2006/0147151 A1 | 7/2006 | Wanninger et al. | |
| 2006/0187651 A1 | 8/2006 | Kim et al. | |
| 2007/0223247 A1 | 9/2007 | Lee et al. | |
| 2007/0223252 A1 * | 9/2007 | Lee | G02B 6/0061 362/615 |
| 2007/0279933 A1 * | 12/2007 | Shiau | G02B 6/0053 362/606 |
| 2008/0002399 A1 | 1/2008 | Villard et al. | |
| 2008/0094853 A1 | 4/2008 | Kim et al. | |
| 2008/0199143 A1 | 8/2008 | Turner | |
| 2008/0266879 A1 | 10/2008 | Chang | |
| 2008/0266901 A1 | 10/2008 | Chang | |
| 2008/0285274 A1 | 11/2008 | Jung | |
| 2009/0027893 A1 | 1/2009 | Chang | |
| 2009/0091948 A1 | 4/2009 | Wang et al. | |
| 2009/0175050 A1 | 7/2009 | Marttila et al. | |
| 2009/0180196 A1 * | 7/2009 | Li | G02B 3/0056 359/641 |
| 2009/0310367 A1 | 12/2009 | Kuo | |
| 2009/0316414 A1 | 12/2009 | Yang et al. | |
| 2010/0008088 A1 | 1/2010 | Koizumi et al. | |
| 2010/0008628 A1 | 1/2010 | Shani | |
| 2010/0053959 A1 | 3/2010 | Ijzerman et al. | |
| 2010/0110673 A1 | 5/2010 | Bergman et al. | |
| 2010/0110679 A1 | 5/2010 | Teng et al. | |
| 2010/0118531 A1 | 5/2010 | Montagne | |
| 2010/0157577 A1 | 6/2010 | Montgomery et al. | |
| 2010/0246158 A1 | 9/2010 | Van Gorkom et al. | |
| 2010/0254129 A1 | 10/2010 | Le Toquin et al. | |
| 2010/0301360 A1 | 12/2010 | Van De Ven et al. | |
| 2010/0302135 A1 | 12/2010 | Larson et al. | |
| 2010/0315833 A1 | 12/2010 | Holman et al. | |
| 2011/0013397 A1 | 1/2011 | Catone et al. | |
| 2011/0013420 A1 | 1/2011 | Coleman et al. | |
| 2011/0044022 A1 | 2/2011 | Ko et al. | |
| 2011/0051457 A1 | 3/2011 | Chen | |
| 2011/0069843 A1 | 3/2011 | Cohen et al. | |
| 2011/0122616 A1 | 5/2011 | Hochstein | |
| 2011/0187273 A1 | 8/2011 | Summerford et al. | |
| 2011/0248287 A1 | 10/2011 | Yuan et al. | |
| 2011/0255303 A1 * | 10/2011 | Nichol | G02B 6/006 362/606 |
| 2011/0261570 A1 | 10/2011 | Okada et al. | |
| 2012/0014128 A1 | 1/2012 | Lin | |
| 2012/0020108 A1 | 1/2012 | Chang | |
| 2012/0026828 A1 | 2/2012 | Fjellstad et al. | |
| 2012/0069575 A1 | 3/2012 | Koh et al. | |
| 2012/0069579 A1 * | 3/2012 | Koh | G02B 6/0021 362/307 |
| 2012/0069595 A1 | 3/2012 | Catalano | |

(56) References Cited

U.S. PATENT DOCUMENTS

| | | | |
|---|---|---|---|
| 2012/0075873 A1 | 3/2012 | Cooper | |
| 2012/0114284 A1 | 5/2012 | Ender | |
| 2012/0140461 A1 | 6/2012 | Pickard | |
| 2012/0147624 A1 | 6/2012 | Li et al. | |
| 2012/0182767 A1 | 7/2012 | Petcavich et al. | |
| 2012/0188774 A1 | 7/2012 | Okada | |
| 2012/0242930 A1 | 9/2012 | Ryu et al. | |
| 2012/0287677 A1* | 11/2012 | Wheatley | G02B 6/0051 362/627 |
| 2012/0307496 A1 | 12/2012 | Phillips et al. | |
| 2013/0003363 A1 | 1/2013 | Lu et al. | |
| 2013/0003409 A1 | 1/2013 | Vissenberg et al. | |
| 2013/0028557 A1 | 1/2013 | Lee et al. | |
| 2013/0033867 A1 | 2/2013 | Coplin et al. | |
| 2013/0039090 A1 | 2/2013 | Dau et al. | |
| 2013/0107518 A1 | 5/2013 | Boyer et al. | |
| 2013/0107527 A1 | 5/2013 | Boyer et al. | |
| 2013/0107528 A1 | 5/2013 | Boyer et al. | |
| 2013/0300310 A1 | 11/2013 | Hu | |
| 2013/0317784 A1 | 11/2013 | Huang et al. | |
| 2013/0328073 A1 | 12/2013 | Lowes et al. | |
| 2013/0336001 A1 | 12/2013 | Boonekamp | |
| 2014/0056028 A1* | 2/2014 | Nichol | G02B 6/0028 362/611 |
| 2014/0211457 A1 | 7/2014 | Tarsa et al. | |
| 2014/0211462 A1 | 7/2014 | Keller et al. | |
| 2014/0211476 A1 | 7/2014 | Yuan et al. | |
| 2014/0211495 A1 | 7/2014 | Yuan et al. | |
| 2014/0211496 A1 | 7/2014 | Durkee | |
| 2014/0211497 A1 | 7/2014 | Yuan et al. | |
| 2014/0211502 A1 | 7/2014 | Keller et al. | |
| 2014/0211503 A1 | 7/2014 | Tarsa et al. | |
| 2014/0211504 A1 | 7/2014 | Yuan et al. | |
| 2014/0211508 A1 | 7/2014 | Yuan et al. | |
| 2014/0212090 A1 | 7/2014 | Wilcox et al. | |
| 2014/0268762 A1 | 9/2014 | Raleigh et al. | |
| 2014/0268875 A1 | 9/2014 | Durkee | |
| 2014/0268879 A1 | 9/2014 | Mizuyama et al. | |
| 2014/0270672 A1 | 9/2014 | Durkee | |
| 2014/2688761 | 9/2014 | Raleigh et al. | |
| 2014/0347885 A1 | 11/2014 | Wilcox et al. | |
| 2014/0355297 A1 | 12/2014 | Castillo et al. | |
| 2014/0355302 A1 | 12/2014 | Wilcox et al. | |
| 2015/0049511 A1 | 2/2015 | Tarsa et al. | |
| 2015/0055369 A1 | 2/2015 | Tarsa et al. | |
| 2015/0055371 A1 | 2/2015 | van de Ven et al. | |
| 2015/0109820 A1 | 4/2015 | Wilcox et al. | |
| 2015/0160396 A1 | 6/2015 | Wilcox et al. | |
| 2015/0177439 A1 | 6/2015 | Durkee et al. | |
| 2015/0192742 A1 | 7/2015 | Tarsa et al. | |
| 2015/0198760 A1 | 7/2015 | Wilcox et al. | |
| 2015/0204491 A1 | 7/2015 | Yuan et al. | |
| 2015/0260905 A1 | 9/2015 | Yuan et al. | |

FOREIGN PATENT DOCUMENTS

| | | |
|---|---|---|
| JP | 2004/0227934 | 8/2004 |
| JP | 2006/0131444 | 5/2006 |
| JP | 2006/0221922 | 8/2006 |
| JP | 2007/0123130 | 5/2007 |
| WO | WO 01/02772 | 1/2001 |
| WO | WO 2014/120968 | 8/2014 |
| WO | WO 2014120672 A2 | 8/2014 |
| WO | WO 2014/145283 | 9/2014 |
| WO | WO 2014120672 A3 | 9/2014 |

OTHER PUBLICATIONS

USPTO Office action dated Nov. 13, 2015, for U.S. Appl. No. 13/841,622 Applicant, Cree, Inc. (7 pages).
International Search Report and Written Opinion dated Mar. 25, 2015, for International Application No. PCT/US2014/072860, Applicant, Cree, Inc. (14 pages).
Invitation to Pay Additional Fees for International Application No. PCT/US2015/032040 dated Aug. 6, 2015, Applicant, Cree, Inc. (2 pages).
International Search Report and Written Opinion for International Application No. PCT/US2015/020601, dated Jul. 31, 2015, Applicant, Cree, Inc. (23 pages).
U.S. Appl. No. 14/291,829, filed May 30, 2014, Inventors, Yuan et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 61/932,058, filed Jan. 27, 2014, Inventors, Carrigan et al. (203 pages).
U.S. Appl. No. 14/618,884, filed Feb. 10, 2015, Inventors, Castillo et al. (56 pages).
U.S. Appl. No. 14/462,322, filed Aug. 18, 2014, Inventors, Castillo et al. (31 pages).
U.S. Appl. No. 62/088,375, filed Dec. 5, 2014, Inventors, Hussell et al. (51 pages).
U.S. Appl. No. 14/618,819, filed Feb. 10, 2015, Inventors, Bendtsen et al. (37 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
IPRP for International Application No. PCT/US2014/013840, dated Aug. 13, 2015, Applicant, Cree, Inc. (10 pages).
International Search Report and Written Opinion for International Application No. PCT/US2014/013840, dated Jul. 28, 2014, Applicant, Cree, Inc. (17 pages).
IPRP for International Application No. PCT/US2014/013891, dated Aug. 13, 2015, Applicant, Cree, Inc., (8 pages).
International Search Report and Written Opinion for International Application No. PCT/US14/30017, dated Aug. 1, 2014, Applicant, Cree, Inc., (21 pages).
International Search Report and Written Opinion for International Application No. PCT/US2014/072848, dated Mar. 25, 2015, Applicant, Cree, Inc., (17 pages).
IPRP for International Application No. PCT/US2014/013934, dated Aug. 13, 2015, Applicant, Cree, Inc., (11 pages).
IPRP for International Application No. PCT/US2014/013854, dated Aug. 13, 2015, Applicant, Cree, Inc., (9 pages).
IPRP for International Application No. PCT/US2014/013931, dated Aug. 13, 2015, Applicant, Cree, Inc., (15 pages).
IPRP for International Application No. PCT/US2014/013408, dated Aug. 13, 2015, Applicant, Cree, Inc., (15 pages).
U.S. Appl. No. 14/839,557, filed Aug. 28, 2015, Inventors, Wilcenski et al. (63 pages).
IPRP for International Application No. PCT/US2014/028887, dated Sep. 24, 2015, Applicant, Cree, Inc., (9 pages).
IPRP for International Application No. PCT/US2014/013400, dated Sep. 24, 2015, Applicant, Cree, Inc., (14 pages).
IPRP for International Application No. PCT/US2014/028938, dated Sep. 24, 2015, Applicant, Cree, Inc., (12 pages).
Non-final Office action dated Jul. 31, 2015, for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Apr. 1, 2015, for U.S. Appl. No. 13/841,074, Applicant, Cree, Inc. (57 pages).
Final Office action dated Jun. 2, 2015, for U.S. Appl. No. 13/841,622, Applicant, Cree, Inc. (58 pages).
Non-final Office action dated Mar. 24, 2015, for U.S. Appl. No. 13/840,563, Applicant, Cree, Inc. (36 pages).
Final Office action dated Jun. 11, 2015, for U.S. Appl. No. 13/938,877, Applicant, Cree, Inc. (40 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated May 20, 2015, for U.S. Appl. No. 14/101,051, Applicant, Cree, Inc. (17 pages).

(56) References Cited

OTHER PUBLICATIONS

Non-final Office action dated Feb. 27, 2015, for U.S. Appl. No. 14/292,778, Applicant, Cree, Inc. (10 pages).
Non-final Office action dated Sep. 4, 2015, for U.S. Appl. No. 14/101,132, Applicant, Cree, Inc. (48 pages).
Non-final Office action dated Aug. 31, 2015, for U.S. Appl. No. 14/292,778, Applicant, Cree, Inc. (49 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
Non-final Office action dated Jun. 30, 2015, for U.S. Appl. No. 14/583,415, Applicant, Cree, Inc. (216 pages).
International Search Report and Written Opinion dated Jan. 11, 2016, for International Application No. PCT/US2015/032040, Applicant, Cree, Inc., (16 pages).
Non-final Office Action dated Dec. 28, 2015 for U.S. Appl. No. 14/472,078, filed Aug. 28, 2014, Applicant, Cree, Inc. (13 pages).
European Patent Office Communication dated Jul. 6, 2016, European Patent Application No. 14192325.0-1562, filed Jul. 11, 2014, Applicant, Cree, Inc. (4 pages).

* cited by examiner

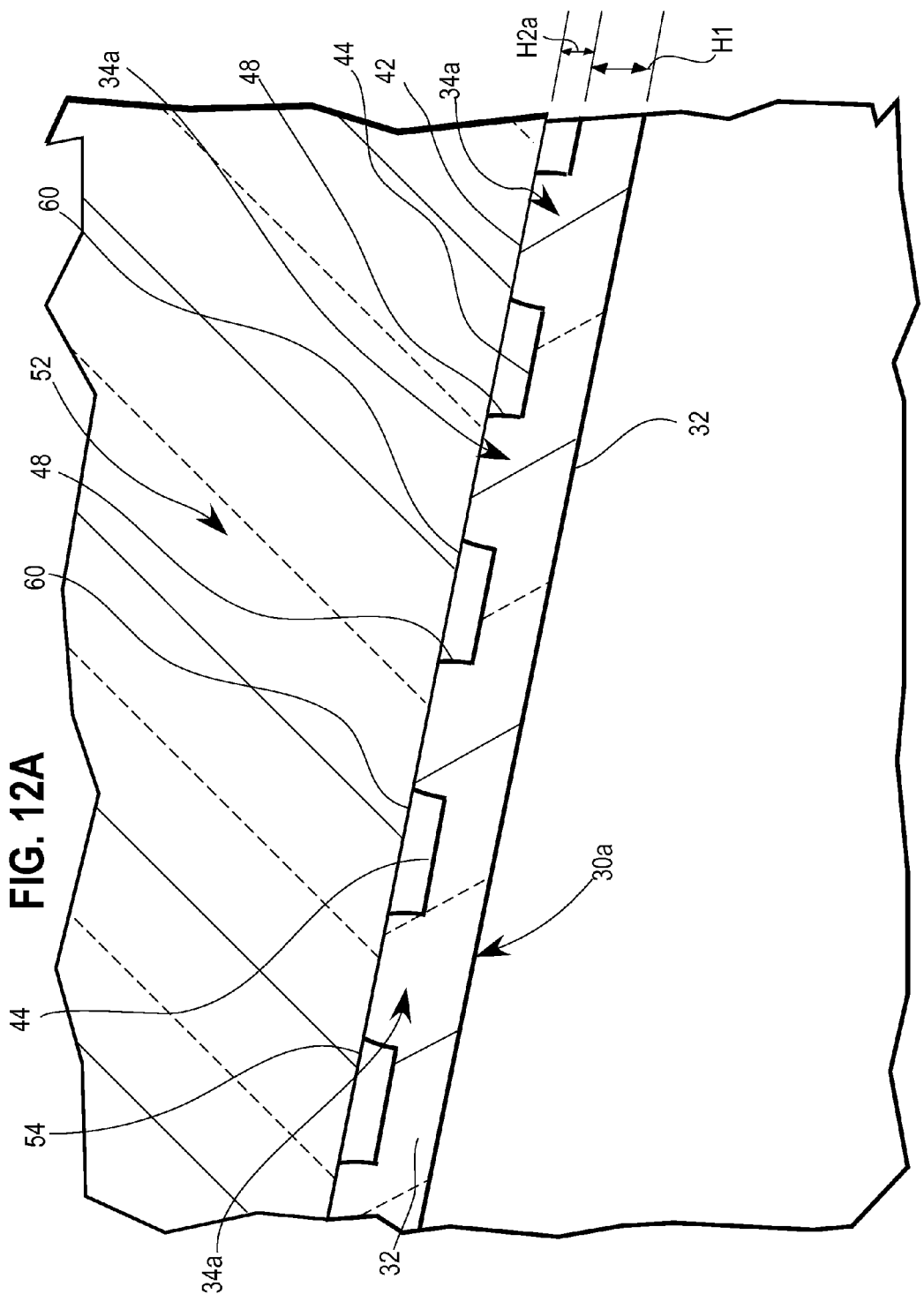

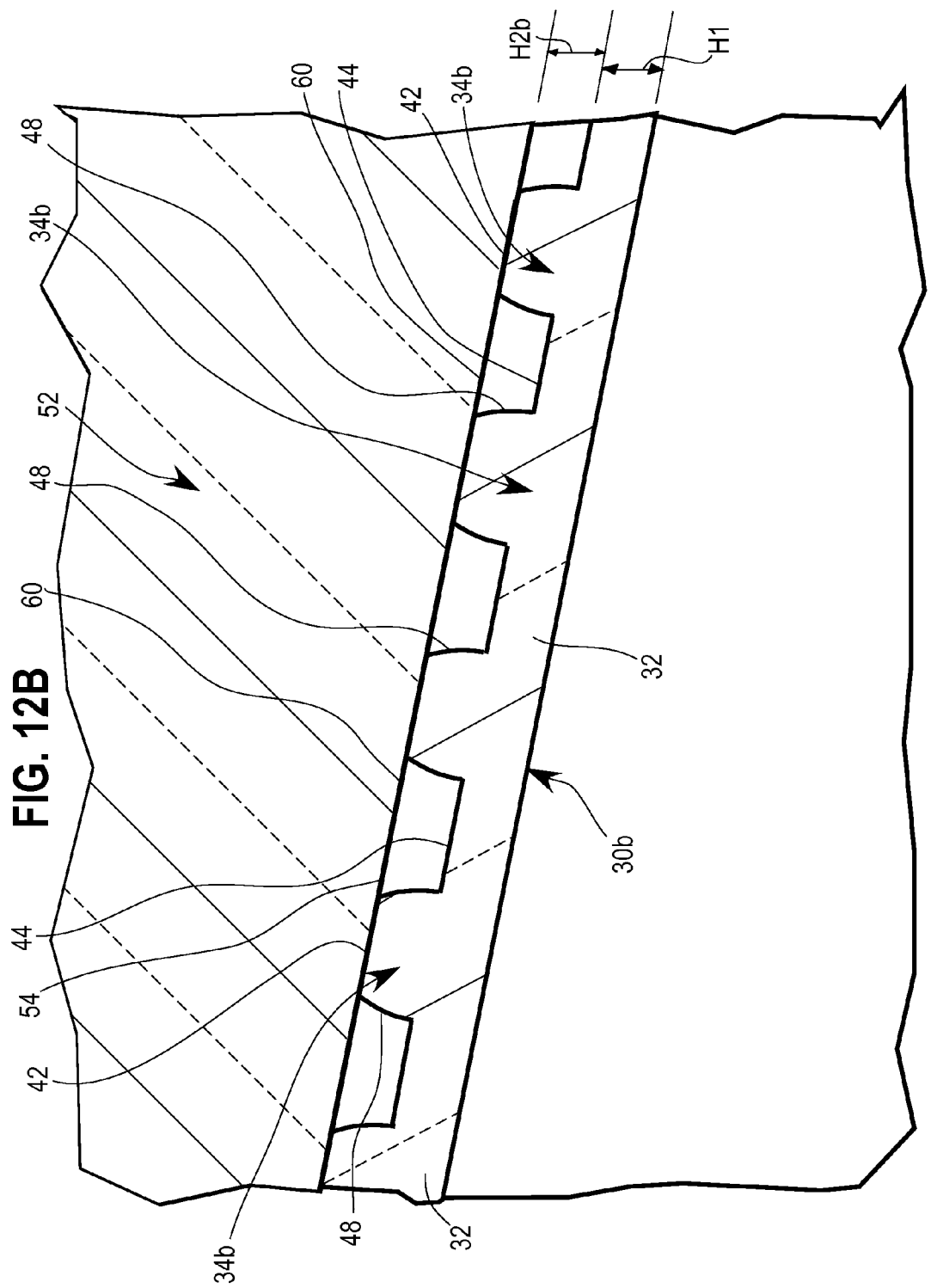

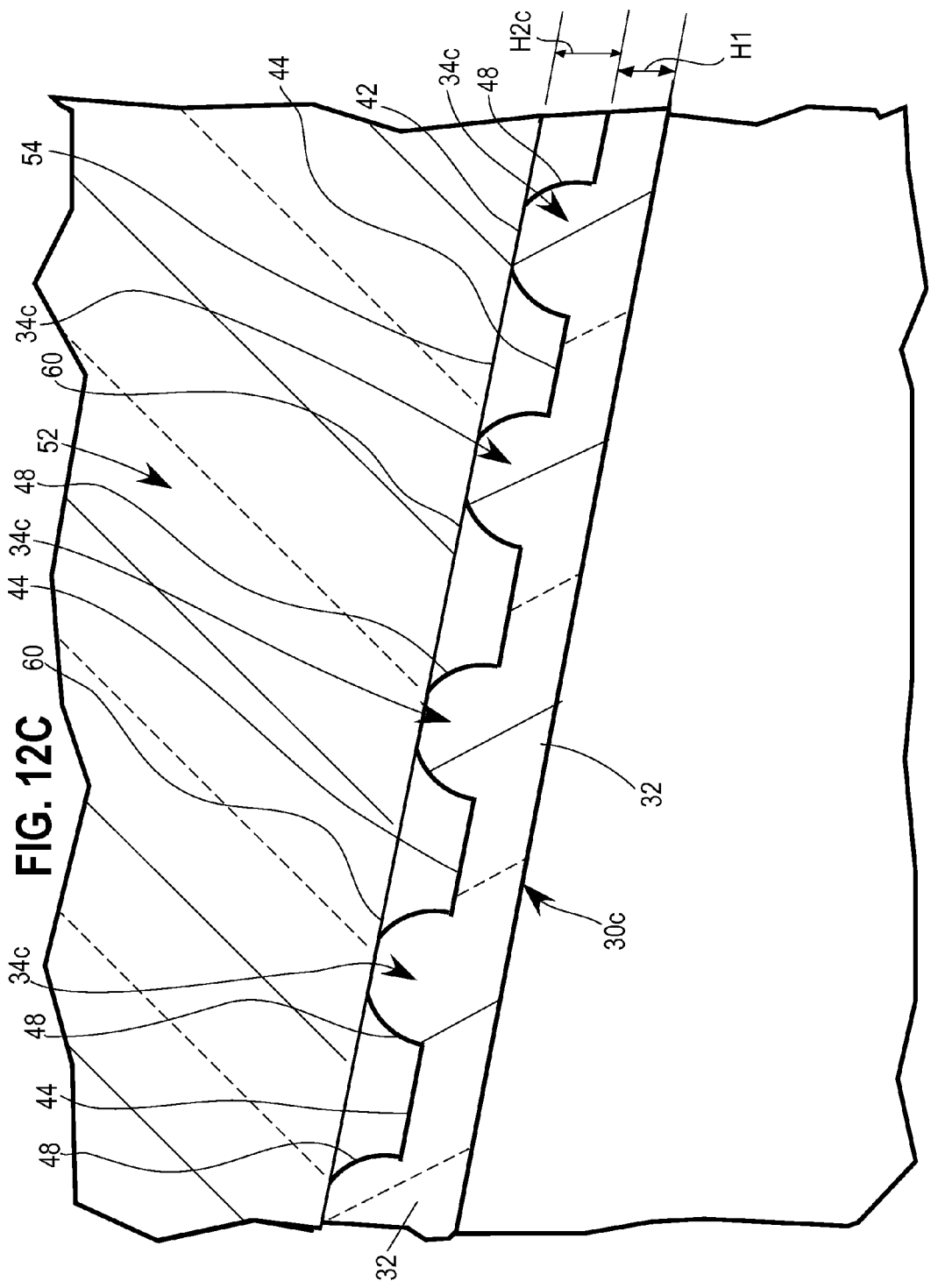

EXTRACTION FILM FOR OPTICAL WAVEGUIDE AND METHOD OF PRODUCING SAME

CROSS REFERENCE TO RELATED APPLICATIONS

The present application claims the benefit of U.S. Provisional Patent Application No. 61/925,589, filed Jan. 9, 2014, entitled "Film Laminated to Waveguide Surface," owned by the assignee of the present application, the disclosure of which is incorporated by reference herein.

REFERENCE REGARDING FEDERALLY SPONSORED RESEARCH OR DEVELOPMENT

This invention was made with government support under contract DE-EE0006264 awarded by the U.S. Department of Energy. The government has certain rights in the invention.

SEQUENTIAL LISTING

Not applicable.

FIELD OF THE DISCLOSURE

The present inventive subject matter relates to optical devices and methods of production of such devices, and more particularly, to an optical waveguide and method of producing same.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting angular distribution of emitted light, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face.

Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an 'edge-lit' approach). However, such luminaires typically suffer from low efficiency due to losses inherent in coupling light emitted from a predominantly Lambertian emitting source such as a LED component into the narrow edge of a waveguide plane.

Beeson et al. U.S. Pat. No. 5,396,350 teaches a backlighting apparatus used for flat panel electronic displays. The apparatus includes a slab waveguide that receives light from a light source positioned adjacent a side surface thereof and an array of microprisms attached to a face of the waveguide. Each microprism has a side surface tilted at an angle from the direction normal to the surface of the waveguide. Light emitted from the microprisms is substantially perpendicular to the slab waveguide.

Zimmerman et al. U.S. Pat. No. 5,598,281 discloses a backlight assembly for electro-optical displays. Light emitted from a light source disposed within a reflector travels through an array of apertures and is collimated by an array of tapered optical elements aligned with the array of apertures. Microlenses may be disposed adjacent the optical elements to further collimate the light. The surfaces of the optical elements are planar or parabolic in shape.

Zimmerman et al. U.S. Pat. No. 5,428,468 teaches an optical illumination system for applications that require substantially collimated light. The system comprises a waveguide that receives light from an edge thereof. An array of microprisms is attached to one face of the waveguide. Each microprism has at least two sidewalls tilted at an angle from the normal of the surface of the waveguide. An array of microlenses may be disposed atop the array of microprisms to further collimate the light.

Steiner et al. U.S. Pat. No. 5,949,933 discloses an optical illumination system for collimating light. The system includes a waveguide that receives light from an and an array of lenticular microprisms attached to one face of the waveguide. Each microprism has a light input surface optically coupled to the waveguide and a light output surface opposite the input surface. The light input surface includes a number of tapered grooves perpendicular to the length of the lenticular microprism. The system also includes an array of microlenses to further collimate the light.

Hou et al. U.S. Pat. No. 5,839,823 teaches an illumination system including a light source adjacent to or housed within a reflector. A light-directing assembly having at least one microprism carried on a base wall is positioned adjacent the light source opposite the reflector. The microprism may be polyhedronal, curvilinear, and polyhedronal curvilinear. A lens array may be disposed on the other side of the base wall.

Kuper et al. U.S. Pat. No. 5,761,355 discloses a light directing optical structure comprising a waveguide having a multiplicity of prisms attached thereto. Light redirected by the prisms is constrained to a range of angles. The side face(s) of the prisms may be planar or curved. An array of lenses may be used to spread the light output of the prisms to a wider distribution angle.

SUMMARY

According to one aspect, an optical waveguide includes a waveguide body and a film disposed on a surface of the waveguide body. The film includes a base and a plurality of undercut light extraction elements disposed between the base and the surface.

According to another aspect, an optical waveguide comprises a waveguide body, and a film disposed on a surface of the waveguide body. The film includes a base and a plurality of undercut light extraction elements disposed in a regular pattern between the base and the surface.

According to yet another aspect, a method of producing an optical waveguide includes the step of providing an optically transmissive film having a base and a plurality of undercut light extraction elements disposed on the base. The method further includes the steps of supplying a waveguide body and securing the film to a surface of the waveguide body with the plurality of light extraction elements disposed between the base and the surface of the waveguide body.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 12A is an enlarged side elevational view of the waveguide body of FIG. 9 with a film having light extraction elements of a certain height applied thereto;

FIG. 12B is an enlarged side elevational view of the waveguide body of FIG. 12A with a film having light extraction elements of an alternative height applied thereto;

FIG. 12C is an enlarged side elevational view of the waveguide body of FIG. 12A with a film having light extraction elements of another alternative height applied thereto.

DETAILED DESCRIPTION

Figure 1:
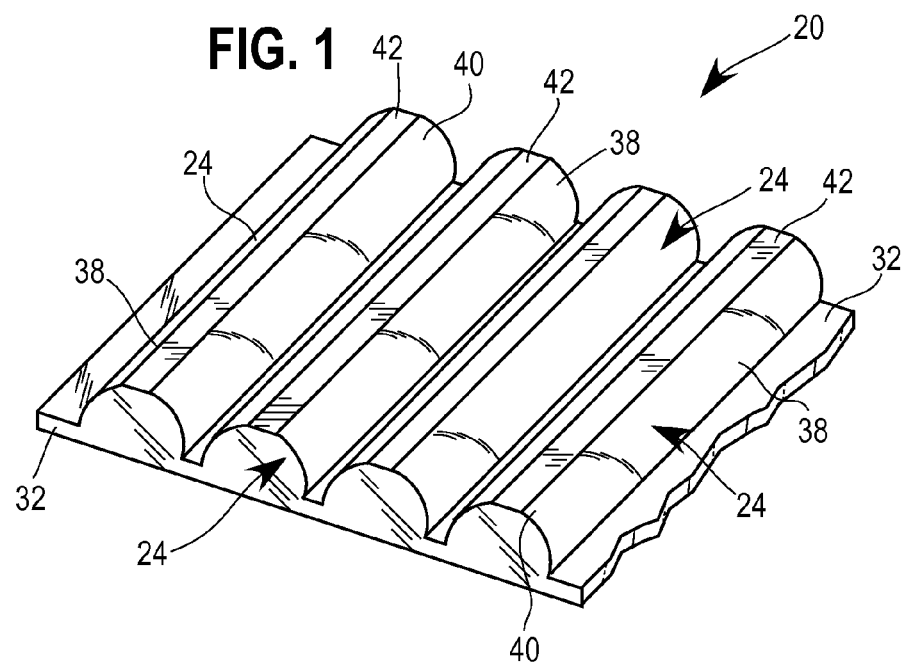
FIG. 1 is a fragmentary isometric view of an embodiment of a film that may be applied to a waveguide body.

An optical waveguide includes a waveguide body that mixes and directs light out of one or more surfaces. An extraction film, having a base and light extraction elements, is disposed on a surface of the waveguide body. The extraction film may be comprised of an optically transmissive material such that the light extraction elements cause an illumination pattern to be developed for general illumination.

Total internal reflection (TIR) has been shown to be an effective approach for extracting light from waveguides and provides broader extracted beam distributions than direct refraction. For lighting applications with high upward/downward ratios and broad extracted beam distributions, TIR extraction may be difficult to achieve with typical waveguide bodies due to geometric constraints. For instance, a waveguide body may require an undercut feature which is not compatible with waveguide fabrication procedures such as molding or embossing. As seen herein, an extraction film with undercut light extraction elements is disposed on a surface of the waveguide body. In one example embodiment, an embossed acrylic film comprising a base and undercut light extraction elements is laminated to the surface of the waveguide body. The undercut light extraction elements are disposed between the base and an extraction surface of the waveguide to provide waveguide geometries such that TIR extraction with high downward/upward ratios and beam spreading is achieved.

In accordance with one aspect, the present disclosure is directed to the distribution and extraction of light from an optical waveguide with a high degree of control. In a particular embodiment, an optical waveguide having a waveguide body achieves a high degree of optical control and optical efficiency with an extraction film disposed on a surface of the waveguide body. The film includes a base and a plurality of undercut light extraction elements, such as, for example, truncated hemispherical light extraction elements disposed between the base and the extraction surface of the waveguide body. The truncated hemispherical light extraction elements of the extraction film may be laminated or otherwise secured to the waveguide body surface to cause an illumination pattern to be developed for general illumination. Further, the light extraction elements may have a truncated prismatic or other curvilinear shape.

The base and light extraction elements of the extraction film may be formed of an optically transmissive material. In one example embodiment, the light extraction elements may form a series of elongate parallel protrusions each having a curved cross sectional shape such as a hemispheric shape. Alternatively, the truncated undercut light extraction elements may be disposed on the base in a hexagonal array. The shape of the light extraction elements secured to the surface of the waveguide body provide for an undercut waveguide geometry that allows TIR extraction to be implemented. As seen herein, the truncated light extraction elements each have a first cross sectional dimension proximal to the base and a second cross sectional dimension smaller than the first cross sectional dimension distal from the base. The height of the undercut light extraction features may selectively vary in different embodiments of the extraction film providing for different sized gaps between the base and the extraction surface of the waveguide body. The truncated curved shape in different embodiments of the light extraction elements provides for a wide range of illuminance distributions by varying the gap between the base of the extraction film and the surface of the waveguide body. Varying the cross sectional shape of the light extraction element will result in varied light extraction and/or light distribution.

In one example embodiment, the film may be comprised of a lenticular film having the light extraction elements positioned on a surface of the base. The film, for example, may comprise an embossed acrylic lenticular film that is configured to be laminated or otherwise attached to the surface of the waveguide body. Alternately, the film may be fabricated using one of a variety of techniques typically applied to the formation of micro-optical films, including gray-scale lithography, micro-replication, injection/compression molding, reactive ion etching, chemical embossing. Further, the film could be fabricated directly on the waveguide surface by means of a sacrificial intermediate layer similar to that described in U.S. Pat. No. 8,564,004 to Tarsa et al. Still further, the region between the extraction features after attachment to the waveguide may partially or wholly comprise a material other than air—for example, a material having a index of refraction that differs significantly from that of the waveguide and film.

The light extraction elements of the film may be arranged in a regular pattern and positioned between the base of the film and the surface of the waveguide body when the film is laminated to the waveguide body. Alternately, the shape, size or density of extraction elements may be varied across the surface of the film in order to produce a desired luminance distribution—for example, to provide a uniform luminance appearance across the light emitting region of a luminaire.

The extraction film of the present disclosure controls stray light and provides for high efficiency extraction, highly directional light distributions (i.e., a high proportion of light emitted from one side of the waveguide), and a wide range of illuminance distributions. Various types of lamps or luminaires, including those requiring disperse or Lambertian illuminance distributions (e.g., typical troffers for general lighting), collimating distributions (e.g., downlights or spotlights), and light sources requiring specific illuminance patterns (e.g., streetlights, architectural lighting) can be realized using the optical waveguide and extraction provided herein. Still further, the extraction elements and/or optical waveguide may be acrylic, silicone, polycarbonate, glass, or other suitable material(s) to achieve a desired effect.

Referring to FIG. 1, one example embodiment of an extraction film 20 includes a base 32 and undercut light extraction elements 24 disposed on the base 32. In this embodiment, the light extraction elements 24 form a series of elongate parallel protrusions 38 extending from the base 32. The elongate parallel protrusions 38 of the light extraction elements 24 seen in the embodiment of FIG. 1 may have a hemispherical cross section shape. A top portion 40 of the light extraction elements 24 may have a generally flattened surface 42 to provide a truncated hemispherical shape of the light extraction elements 24 extending from the base 32.

The extraction film 20 may be an optically transmissive film. The film 20 may be an embossed film formed from an optically transmissive material that exhibits TIR characteristics such as an acrylic material. Alternatively, the optically transmissive film 20 may be fabricated from polycarbonate material, silicone, glass, or other suitable optically transmissive materials. Additionally, the film 20 may be secured to a surface of an optical waveguide body 52 via lamination wherein the flat surfaces 42 of the light extraction elements 24 are laminated to an extraction surface 54 of the waveguide body 52, as seen in further detail with reference to FIGS. 8 and 9. Lamination of the extraction film 20 to the waveguide body 52 provides for continuity of continuous material in instances when the waveguide and extraction film are made of the same material. The extraction film 20 may be bonded directly to the waveguide surface (e.g., through chemical or thermal bonding, or a combination of the two). Alternatively, the waveguide body 52 and extraction film 20 may be bonded through one or more intermediate layers (such as an adhesive layer or pressure-sensitive adhesive film).

Figure 2:
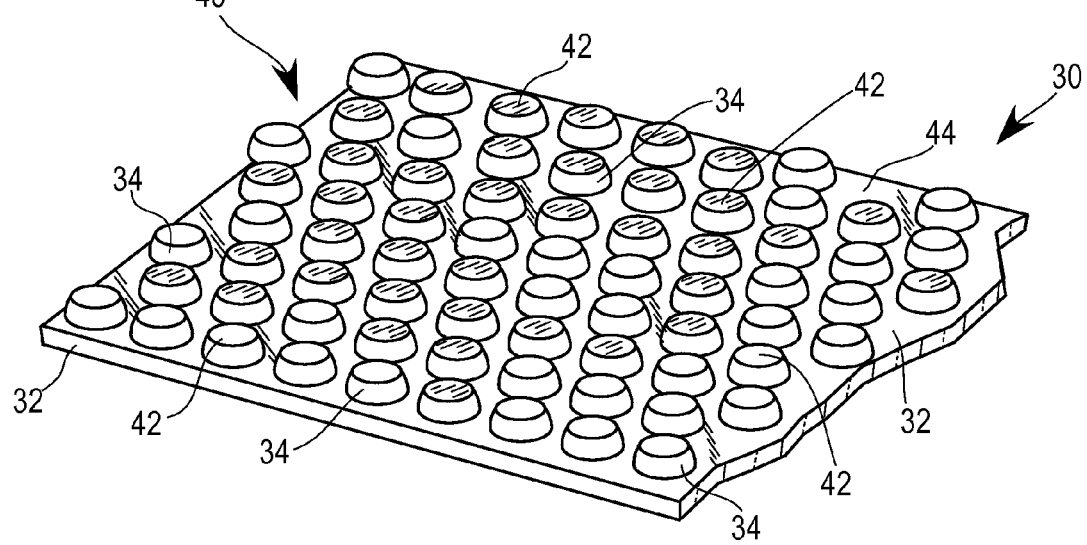
FIG. 2 is a fragmentary isometric view of another embodiment of a film that may be applied to a waveguide body.
Figure 3:
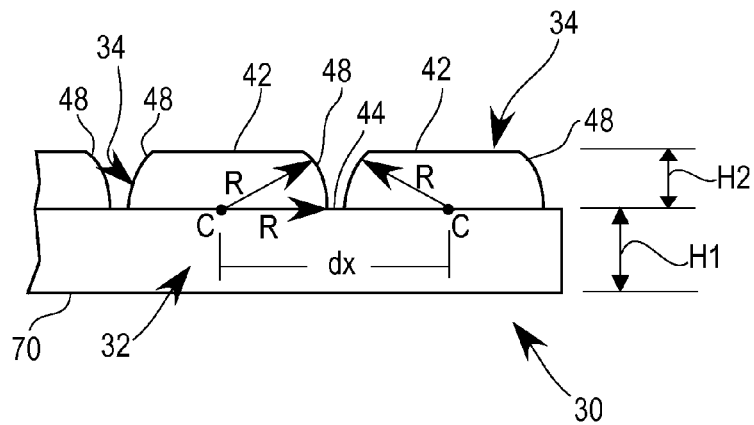
FIG. 3 is a fragmentary side view of the film in the embodiment of FIG. 2.
Figure 4:
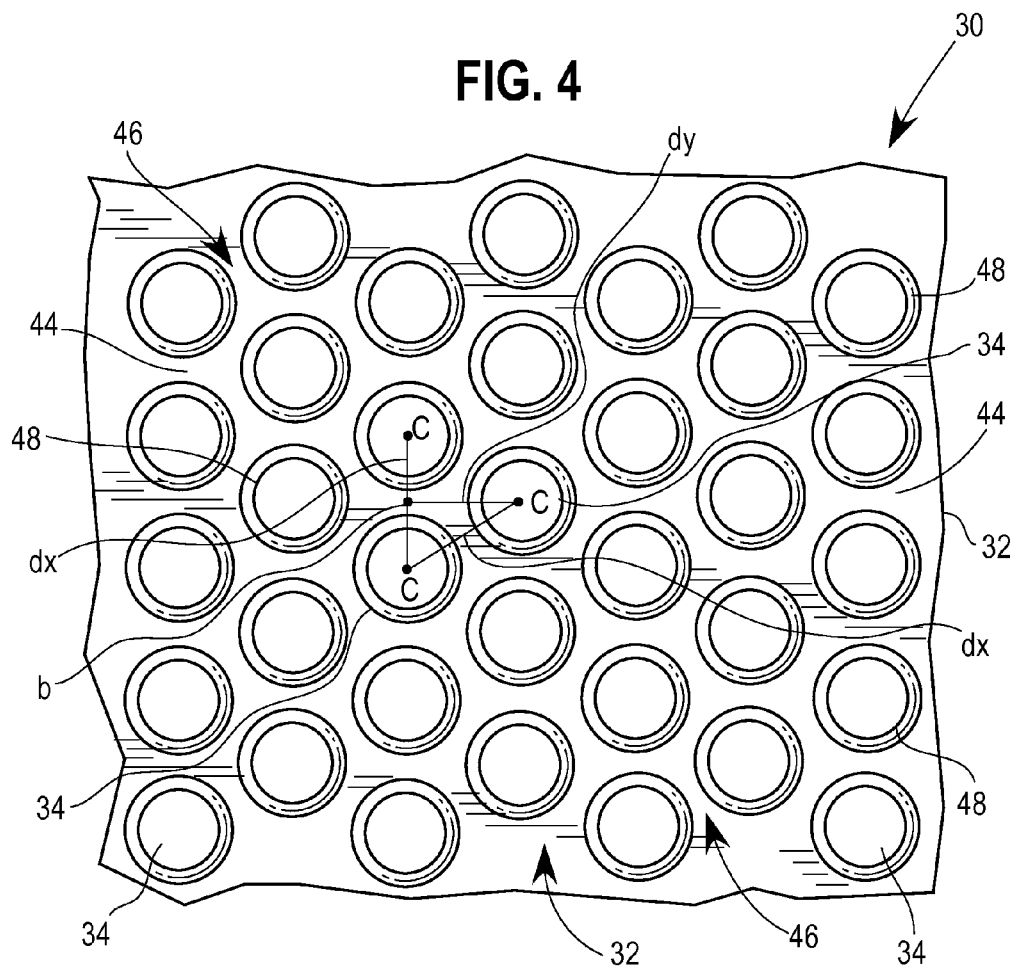
FIG. 4 is a top view of the film in the embodiment of FIG. 2.

FIGS. 2-4 illustrate an example embodiment of an extraction film 30 in which light extraction elements 34 are disposed in a regular pattern atop a surface 44 of the base 32. In this illustrated example, the extraction film 30 comprises an array 46 of regularly-spaced light extraction elements 34, although it should be noted that the light extraction elements may be irregularly spaced or some may be regularly spaced and others irregularly spaced, etc. Further, the geometry and size of the light extraction elements may vary across the film 30 in either a regular or irregular fashion. In this example, the optically transmissive film 30 may be formed with the light extraction elements 34 disposed in a hexagonal array 46 on the top surface 44 of the base 32. The undercut light extraction elements 34 are of substantially the same size and have substantially the same shape within the same extraction film member 30 in this embodiment. The undercut light extraction elements 34 arranged in the hexagonal array 46, in this example, have a truncated hemispherical shape. The light extraction elements 34 may have other shape(s) necessary to produce a desired light distribution. The light extraction elements 34 may be formed using one of a variety of techniques typically applied to the formation of micro-optical films, including gray-scale lithography, micro-replication, injection/compression molding, reactive ion etching, chemical embossing during production of the optically transmissive film 30.

As seen in the example embodiment of FIGS. 2 and 3, the base 32 has a constant height (H1) or thickness. In alternative embodiments, however, the thickness (H1) of the base 32 may vary at different points along the base. Further, it may be desirable to fabricate varying degrees of roughness, or specific optical features, such as a second set or array of geometrical light extraction elements on the back surface 70 of the film 30 (FIG. 3) in order to further provide control over the luminance and illuminance distributions. Still further, the thickness (H1) may be essentially zero (e.g., in cases where the light extraction elements 34 are fabricated directly on the waveguide surface. According to one embodiment, the thickness (H1) of the base 32 is about 1 micrometers to about 5,000 or more micrometers, and more preferably is between 250 micrometers and about 3,000 micrometers, and most preferably is equal to about 500 micrometers. Further, as seen in the illustrated embodiment of FIGS. 2-4, each of the truncated light extraction elements 34 of the extraction film 30 may have a height (H2), FIG. 3, extending from the base 32 that is substantially the same for each light extraction element. In alternative arrangements, the height (H2) of the individual light extraction elements may selectively vary within the same extraction film 30. Still further, as shown in greater detail hereinafter with reference to FIGS. 9-13, the extraction film 30 may be laminated or otherwise affixed to a surface of an optical waveguide body such that the height (H2), FIG. 3, of the undercut light extraction elements 34 may be selectively varied to produce a wide range of illuminance distributions according to user preference. According to one example embodiment, the height (H2) of each light extraction element of an extraction member may range from about 100 micrometers to about 590 micrometers with a radius (R) of approximately 600 micrometers.

The light extraction elements 34 extend from the top surface 44 of the base 32 to a generally flat surface 42 such that the curved shape of the light extraction member 34 is truncated by the flat surface. In this example, the truncated hemispherical light extraction elements 34 have a uniform rounded side surface 48, FIG. 3, which extends from the top surface 44 of the base 32 to the generally flat surface 42 of the light extraction element 34. As such, with the light extraction elements 34 having a uniform rounded side surface 48, each light extraction element 34 has a cross section dimension that is largest proximal the base 32 and the cross sectional dimension becomes smaller distal from the base as the rounded side surface 48 extends from the base towards the flat portion 42. The hemispherical light extraction elements 34 may have a radius (R) at a preselected length that is truncated by the flat surface 42 to a preselected height (H2). In one example, the hemispherical shaped light extraction elements 34 may have a 600 micrometer radius that is truncated to a height that may range, for example, between 100-590 micrometers. Of course, other radial lengths and truncated heights may selectively be employed. Still further, the minimum distances between adjacent light extraction elements 34 may selectively depend on the radius (R) of the light extraction element and the limitations of the film fabrication method employed, with an example minimum distance being twice the radius (2×(R))—with the (extraction elements touching at base for close-packing) or greater. In other examples, values less than twice the radius (2×(R)) may be used where overlapping of the extraction elements is desired for optical reasons (e.g., to improve extraction efficiency).

As seen in FIG. 4, the truncated light extraction elements 34 are disposed in a pattern of alternating staggered rows on the top surface 44 of the base 32. In this example embodiment, the distances (dx) between the center points (c) of adjacent extraction elements may be consistent throughout the array. The center-to-center spacings (dx) of the protruding light extraction elements 34 may selectively have a value of about twice the radius (2×(R)) in regions where a high level of extraction (and hence a luminance approaching the maximum possible light output for that region) is desired with the bases of the extraction elements just in contact. In regions where reduced luminance are desired, values greater than twice the radius (2×R)) are used. In cases where the maximum possible light extraction are desired, it may be useful to incorporate values slightly less than twice the radius such that there exists a slight overlap between the light extraction elements 34 at the base 32. In this example, a distance (dx) of 1.5 millimeters may be employed between adjacent extraction element center points (c) in the array. As such, a distance (dy) between a centerpoint (c) of an extraction element in one row to a bisector point (b) which is a midpoint between the adjacent extraction elements in an adjacent row may also be set to a consistent length in the array 46. In this example, the distance (dy) may be approximately 1.3 millimeters (or more precisely, $(dy)=((dx) \times \sqrt{3})/2$ for a regular hexagonal array) in the hexagonal array 46 having an approximate 1.5 millimeter distance for (dx). One particular example embodiment may, for instance, provide an extraction member 30 having 600 micrometer radius hemispherical extraction elements truncated to a height (H2) of 378 micrometers arranged in a hexagonal array of 1.5 millimeters (dx) by 1.3 millimeters (dy). In various other embodiments, alternative lengths for dx and dy distances may be selectively employed. As provided herein, the selectable height (H2) of the truncated hemispherical extraction elements as well as the pattern of undercut light extraction elements atop the base of the film provide for a wide range of illuminance distributions.

Figure 5:
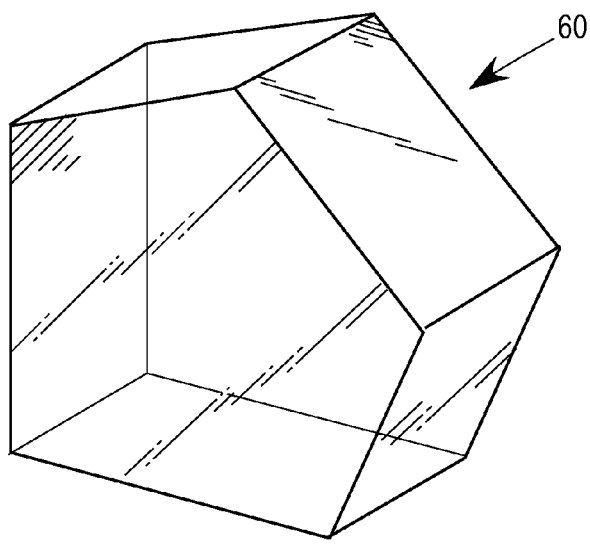
FIGS. 5-7 are isometric views of prismatic shaped light extraction elements.
Figure 6:
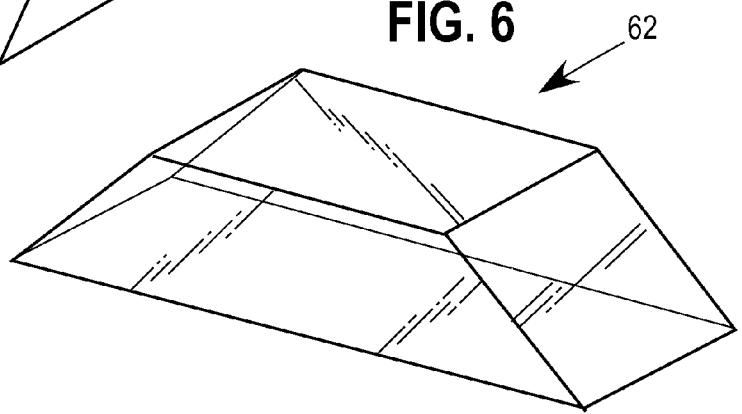
Figure 7:
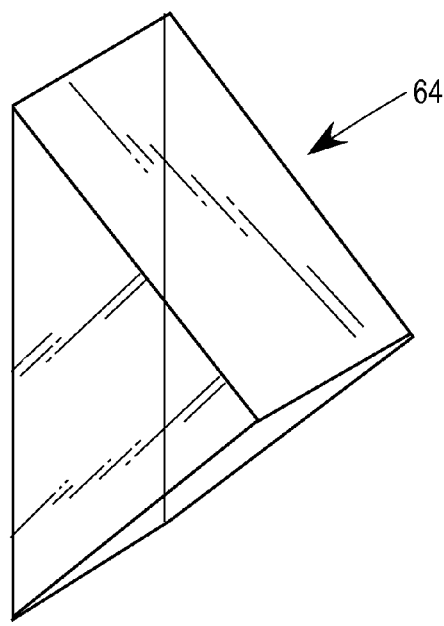

FIGS. 5-7 illustrate alternative shaped light extraction elements. The light extraction elements in FIGS. 5-7 have prismatic shapes providing for alternative undercut geometries for light extraction. In particular, a penta prism shape 60 is shown in FIG. 5, a dove prism shape 62 is shown in FIG. 6 and a porro prism shape 64 is shown in FIG. 7. The prismatic shaped light extraction elements may be formed on the top surface 44 of the base 32 in alternative embodiments of the extraction film. The prismatic shaped light extraction elements may also be included with the truncated hemispherical light extraction elements 34 on the top surface 44 of the base of the extraction film 30. For example a hexagonal array 46, FIGS. 2-4, of light extraction elements disposed on the base 32 of the extraction member 30 may have both truncated hemispherical and prismatic shaped light extraction elements arranged in the array. Various arrangements and combinations of truncated curved and prismatic shaped light extraction elements may be selectively employed.

Figure 8:
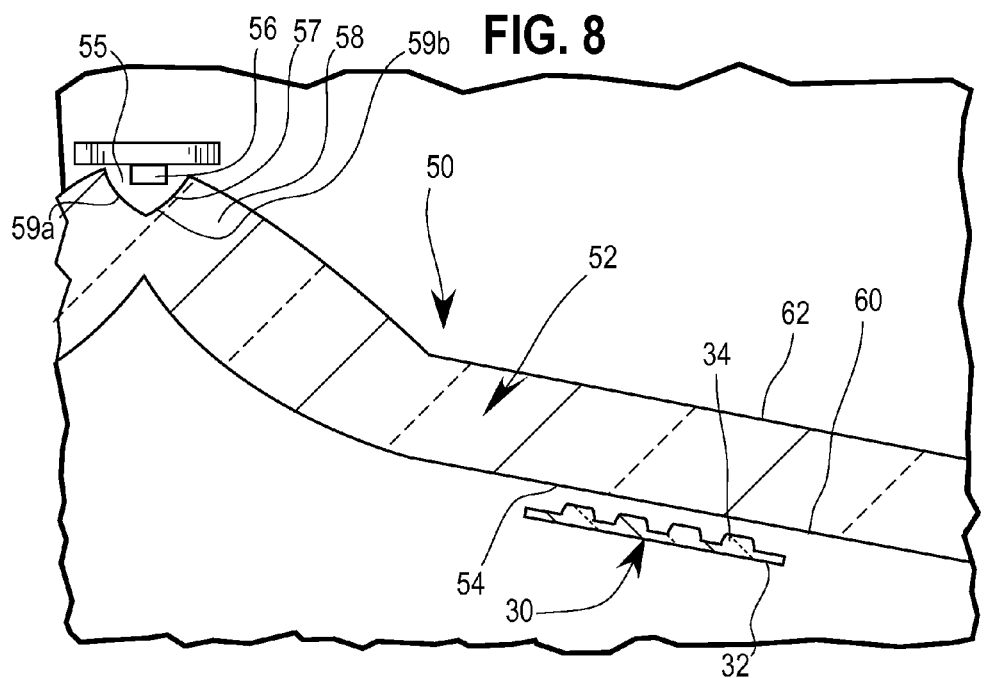
FIG. 8 is a fragmentary side elevational view of a waveguide body before application of a film thereto.
Figure 9:
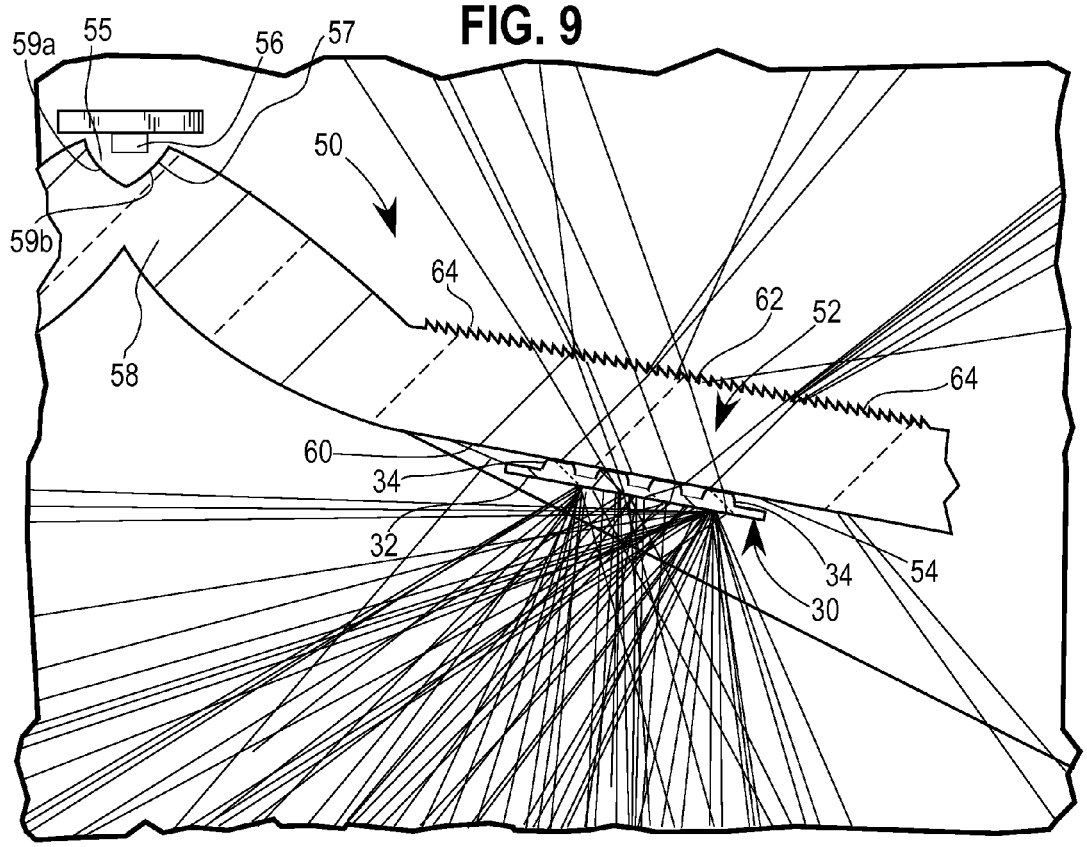
FIG. 9 is a fragmentary side elevational view of a waveguide body after application of a film thereto.

FIGS. 8 and 9 illustrate an application of the film 30 to the waveguide body 52 of an optical waveguide 50. The optical waveguide 50 in this example embodiment has a light source 56 disposed in an input portion 55 having a control section 57 with a pair of control surfaces 59a, 59b. A coupling cavity 58 extends from the control section 57 with the waveguide body 52 extending from the coupling cavity 58. The control surfaces 59a, 59b may, for example, be designed to cause light developed by the light source 56 disposed in or adjacent the light coupling cavity 58 to be directed into the extended arm portions of the waveguide body 52. Light rays may travel through the waveguide body 52 due to total internal reflection. According to well-known TIR principles, the light rays continue to travel through the waveguide body 52 until such rays strike an index of reflection surface at a particular angle less than an angle measured with respect to a line normal to the surface point at which a light ray is incident or, equivalently, until the light rays exceed an angle measured with respect to a line tangent to the surface point at which the light ray is incident, and the light rays escape, as seen in FIGS. 9 and 10.

The light source 56 may develop light that is coupled into the waveguide body 52 via coupling cavity 58. The light source 56 may be one or more light emitting diodes (LEDs) or other alternative light source suitable to emit light to the waveguide body 52. The light source 56, for example, may be a white LED or may comprise an LED module or multiple LEDs including a phosphor-coated LED either alone or in combination with a color LED, such as a green LED, etc. In those cases where a soft white illumination is to be produced, the light source may include a blue shifted yellow LED and a red LED. Different color temperatures and appearances could be produced using other LED combinations, as is known in the art.

As seen in FIG. 8, prior to lamination, extraction film 30 is aligned with an extraction surface 54 of the waveguide body 52 such that the light extraction elements 34 are positioned to contact the extraction surface 54. The waveguide body 52 and the extraction film 30 may be made of the same material. For example, both the waveguide body 52 and the embossed extraction film member 30 may be made of an acrylic material, a silicone, a polycarbonate, glass, or other suitable optically transmissive material. Alternatively, the waveguide body 52 and the extraction film 30 may be made from different optically transmissive materials.

Figure 10:
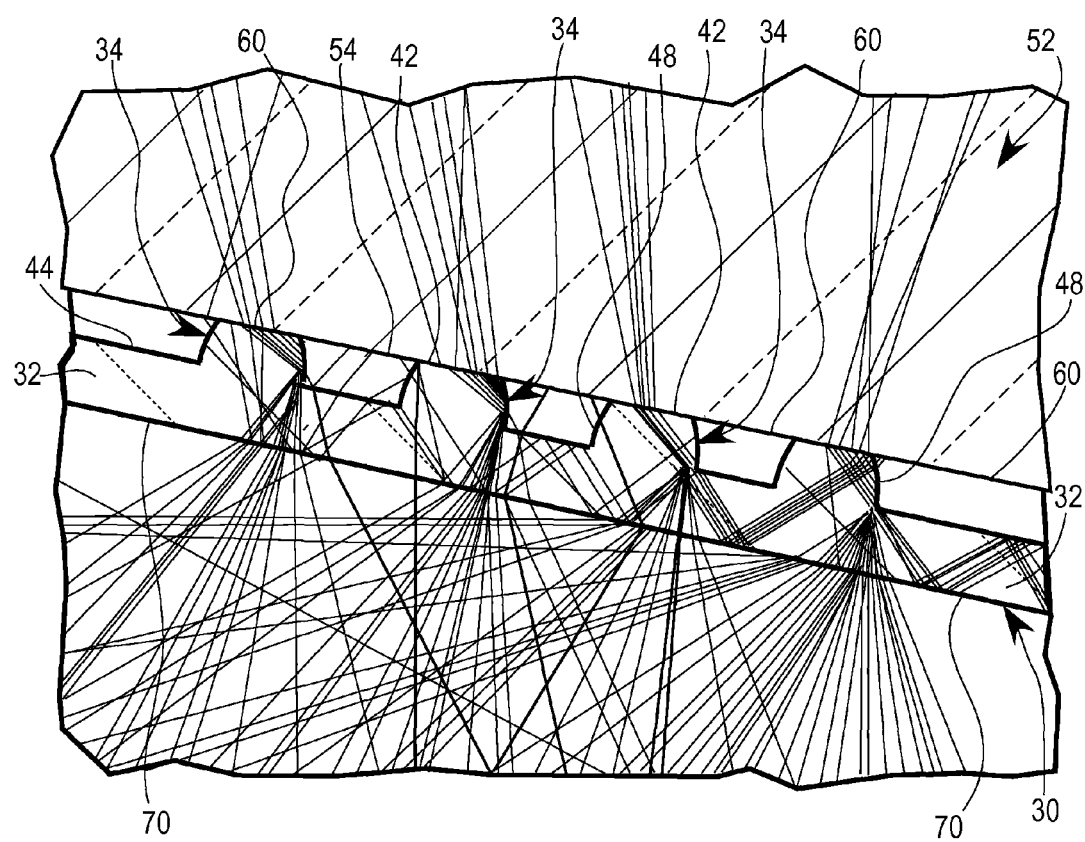
FIG. 10 is an enlarged side elevation view of the waveguide body of FIG. 9 with a film applied thereto.

In FIGS. 9 and 10, the extraction film 30 is shown secured to extraction surface 54 of the waveguide body 52. In this example embodiment, the truncated hemispherical light extraction elements 34 may be laminated to the bottom surface 60 of the waveguide body 52 to provide undercut geometries for implementing TIR extraction. The light extraction elements 34 are disposed between the base 32 and the bottom surface 60 of the waveguide body 52 such that reflected light from the waveguide body 52 enters the extraction member 30 through the truncated hemispherical light extraction elements 34. The truncated hemispherical light extraction elements 34 laminated to the bottom surface 60 of the waveguide body 52 and disposed atop the base 32 provide for illumination patterns to be developed for general illumination. In this example embodiment, the bottom surface 60 of the waveguide body 52 may be a generally smooth surface with the laminated embossed extraction film 30 providing for controlled extraction of light from the bottom surface 60.

As seen in FIG. 9, a top surface 62 opposing the bottom surface 60 of the waveguide body 52 may include additional alternatively shaped light extraction elements 64 to be disposed on the top surface. The additional alternative light extraction elements 64 may be formed of various patterns or configurations along the top surface 62 of the waveguide body 52 to provide a desired extraction feature. For example, the top surface 62 may be textured or stepped with alternating ridges and troughs or may comprise any other structures. In alternative embodiments, the bottom surface 60 of the waveguide body 52 may also be textured, stepped or otherwise modified from a smooth surface to provide a light extraction feature along with the extraction film 30 secured thereto.

Referring to FIG. 10, the extraction film 30 is shown applied to the waveguide body 52 wherein the film has an index of refraction that is the same or nearly identical to the index of refraction for the waveguide body. In this example, the waveguide body 52 and the extraction film 30 are made of the same material. As seen in FIG. 10, light rays propagating within the waveguide body 52 may enter the extraction film 30 through an 'aperture' or interface created by bonding the flat surfaces 42 of the light extraction elements 34 to the extraction surface 54 of the waveguide body 52. Certain light rays may encounter the rounded or primary extraction surface 48 of the undercut light extraction elements 34 and reflect or refract from the curved surface 48 depending on the angle of incidence. Light rays may then be directed towards the base 32 and exit a bottom surface 70 of the film 30 for controlled extraction. Combined with the aperture described above, the rounded surface 48 of the truncated hemispherical light extraction elements 34 provides for undercut features and extraction geometries for controlled illumination. Additionally, illumination patterns may selectively be varied based on the height of the truncated hemispherical light extraction elements of the extraction member.

The light extraction elements 34 of the extraction film 30 disposed on the bottom surface 60 of the waveguide body 52 cause the light rays to exit the waveguide body 52 in a controlled fashion. The light rays that interact with the curved extraction surfaces 48 first enter the extraction film 30 through the aperture formed by the contact between the top of the light extraction element 42 and the bottom surface 60 of the waveguide. The aperture at the flat surface 42 of the light extraction elements 34 ensures that the light rays interacting with the curved extraction surfaces 48 do so primarily after reflecting off the top waveguide surface 62 (FIG. 9). This approach provides significant benefits over known extractors having extraction surfaces that interact with light incident from both waveguide surfaces. Since rays reflecting off of opposite surfaces in a waveguide do so in essentially opposite directions, it is difficult for conventional extraction surfaces to provide well-controlled illuminance distributions over a range of illuminance patterns with high extraction efficiency and high directionality (e.g., upward vs. downward emitted light).

In addition to providing control over the primary direction of the light rays interacting with the curved extraction surfaces 48, it may also be desirable in some applications to further control the distribution of angles of the primary direction of the light rays within the waveguide 50. Controlling the angular distribution of rays may be achieved via various optical surfaces such as the primary optic or lens of the LED 56, FIG. 9, waveguide control 57 and the control surfaces 59, etc. Controlling the angular distribution of light within the waveguide as well as control over the direction of the light rays hitting the extraction surfaces 48 can provide additional control over the emitted illuminance distribution, luminance distribution, optical efficiency and directionality of the luminaire. As seen, use of the extraction film 30 (either alone or with additional angular control distribution within the waveguide) results in highly controlled beams that can be either extracted in a collimated fashion, or spread into wide distribution for various selectable illumination patterns depending on the height of the light extraction elements 34 employed in the extraction film 30.

Figure 11:
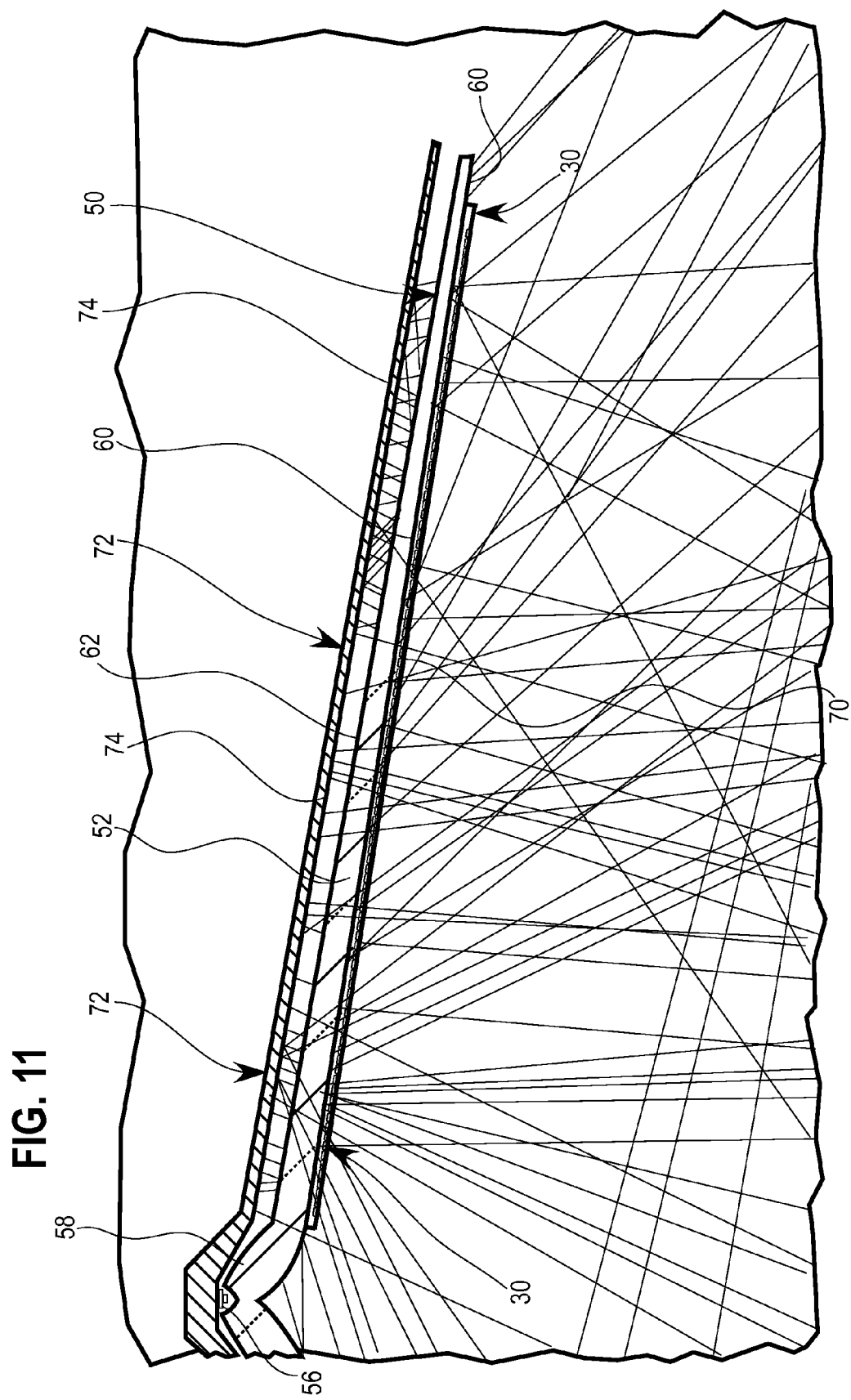
FIG. 11 is a fragmentary side elevational view of a waveguide body with a film disposed along one surface of the waveguide body with a reflector disposed adjacent an opposing surface thereto.

Referring to FIG. 11, optical waveguide 50 shown with extraction film 30 disposed along the bottom extraction surface 60 the waveguide body 52 with a light reflective member 72 disposed adjacent the opposing top extraction surface 62 of the waveguide body 52. In this example embodiment representing a traditional ceiling mounted troffer-type luminaire, the light reflective member 72 may be disposed above the optical waveguide 50. The reflector 72 may include a surface 74 that has a white or specular reflective coating or other member secured or otherwise applied thereto. Light exiting the top surface 62 of the waveguide 50 is reflected off the surface 74 and re-directed downward through the waveguide and extraction film 30 where it may provide useful illumination for the room, thereby improving efficiency.

Referring now to FIGS. 12A-12C, example extraction films 30a, 30b, 30c are shown each having corresponding light extraction elements 34a, 34b, 34c having different respective heights H2a, H2b, H2c. FIGS. 12A-12C illustrate the different sized gaps between the top surface 44 of the lenticular film base 32 and the bottom extraction surface 54 of the waveguide body 52. The extraction films and the optical waveguides may be formed from the same material have the same or near identical index of refraction in the examples of FIGS. 12A-12C. The gap in each example embodiment corresponds to the height H2a, H2b, H2c of the truncated hemispherical light extraction elements 34a, 34b, 34c. As provided herein, varying the length of the gap (i.e., the height H2a, H2b, H2c) provides for a wide range of illuminance distribution patterns from the optical waveguide having extraction films affixed thereto. For example, the illuminance distributions shown in FIGS. 13A-13J correspond to the simulated distributions obtained by systematically varying the height H from 132 micrometers to 574 micrometers. In the example embodiments of FIGS. 12A-12C, the extraction films each have the same base height H1 and the same hexagonal array pattern of light extraction elements. To obtain the illuminance distributions, in these example embodiments, the extraction film 30a, 30b, 30c comprised a 1.5 millimeter×1.3 millimeter hexagonal array of light extraction elements with a 600 micrometer radius and a base height of 500 micrometers, with the extraction films each secured to a 1° tapered waveguide. In the example extraction films 30a of FIG. 12A, the truncated hemispherical light extraction elements 34a had a height (H2a) of 181 micrometers which resulted in an illuminance distribution pattern corresponding to pattern seen in FIG. 13B. In the example extraction film 30b of FIG. 12B, the truncated hemispherical light extraction elements 34b had a height (H2b) of 378 micrometers which resulted in an illuminance distribution pattern corresponding to the pattern seen in FIG. 13F. In the example extraction film 30c of FIG. 12C, the truncated hemispherical light extraction elements 34c had a height (H2c) of 574 micrometers which resulted in an illuminance distribution pattern corresponding to the patterns seen in FIG. 13J. As seen, a wide range of highly controlled illuminance distributions may be achieved with the extraction film provided herein by varying the gap between the base of the extraction film and the surface of the waveguide body.

Figure 13A:
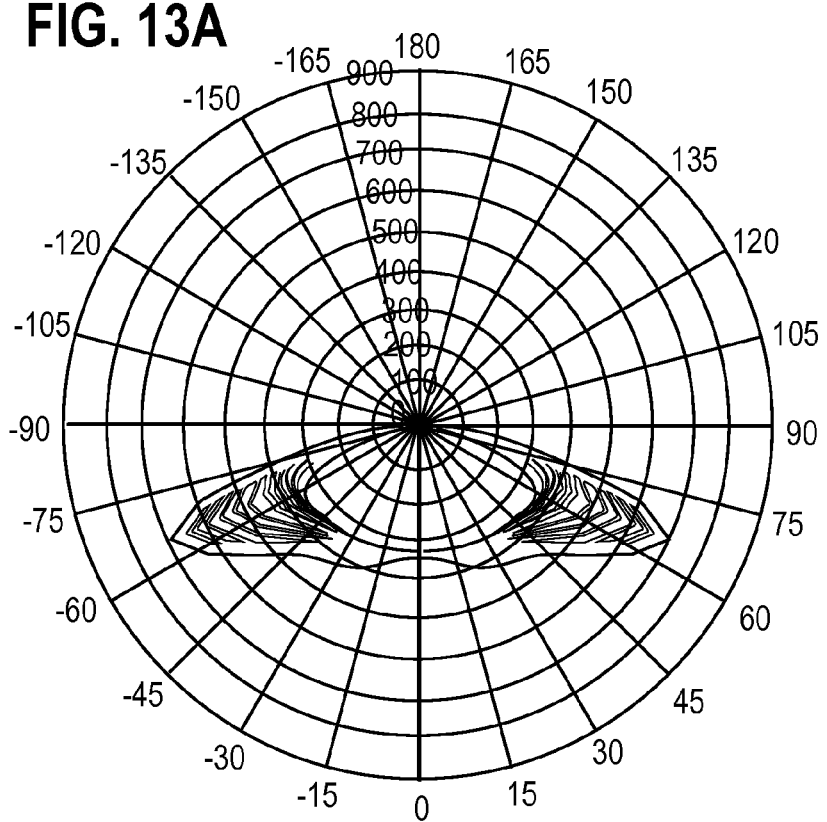
FIGS. 13A-13J illustrate illuminance distribution patterns associated with optical waveguides having films secured thereto with light extraction elements of respective varying heights.
Figure 13B:
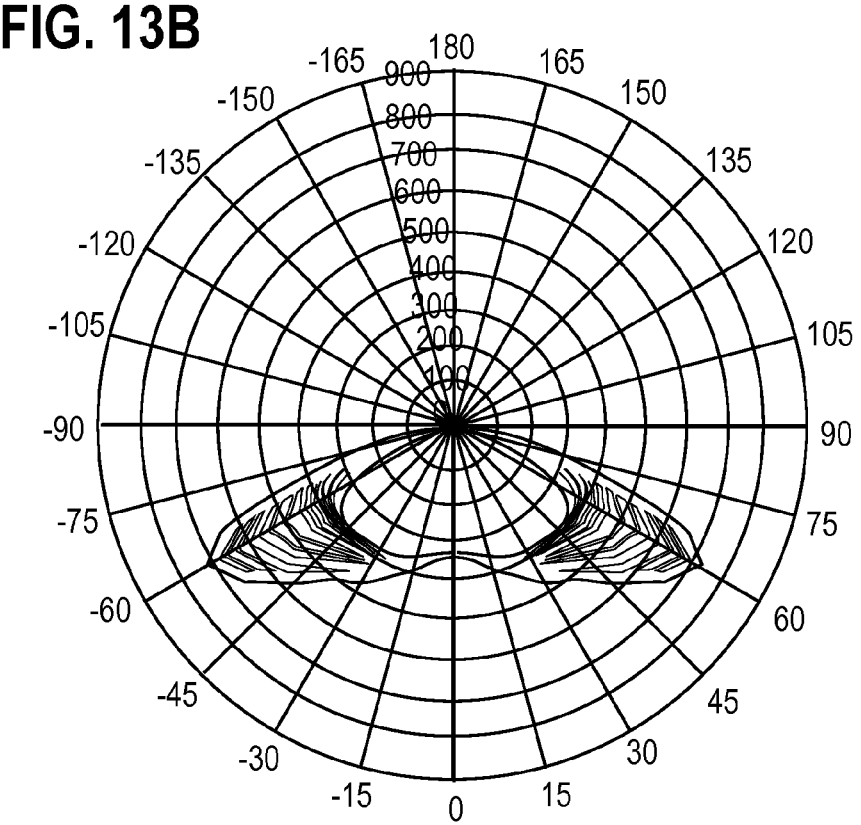
Figure 13C:
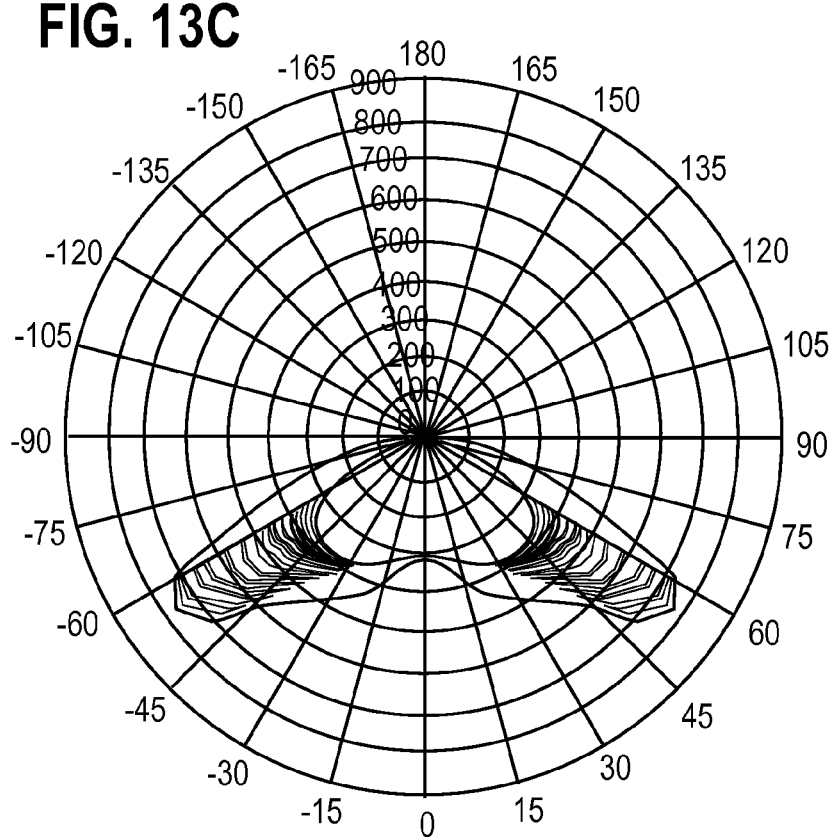
Figure 13D:
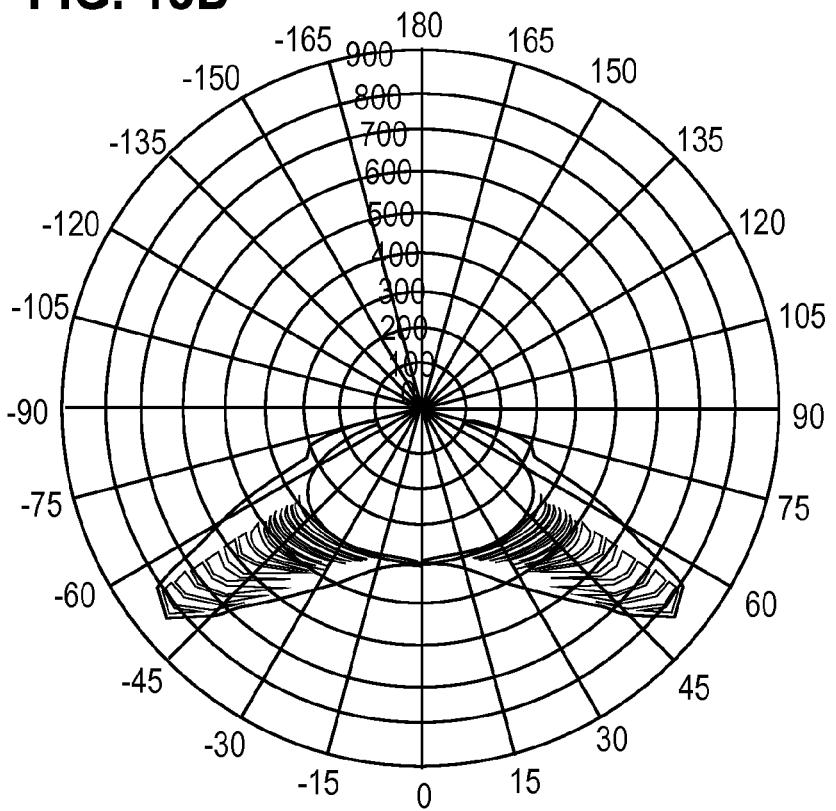
Figure 13E:
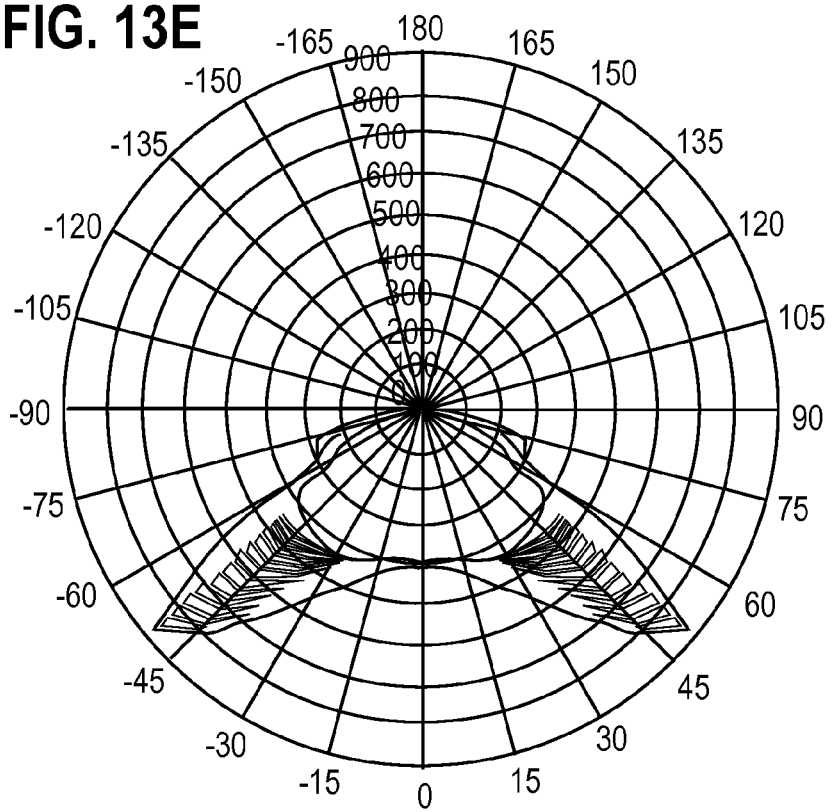
Figure 13F:
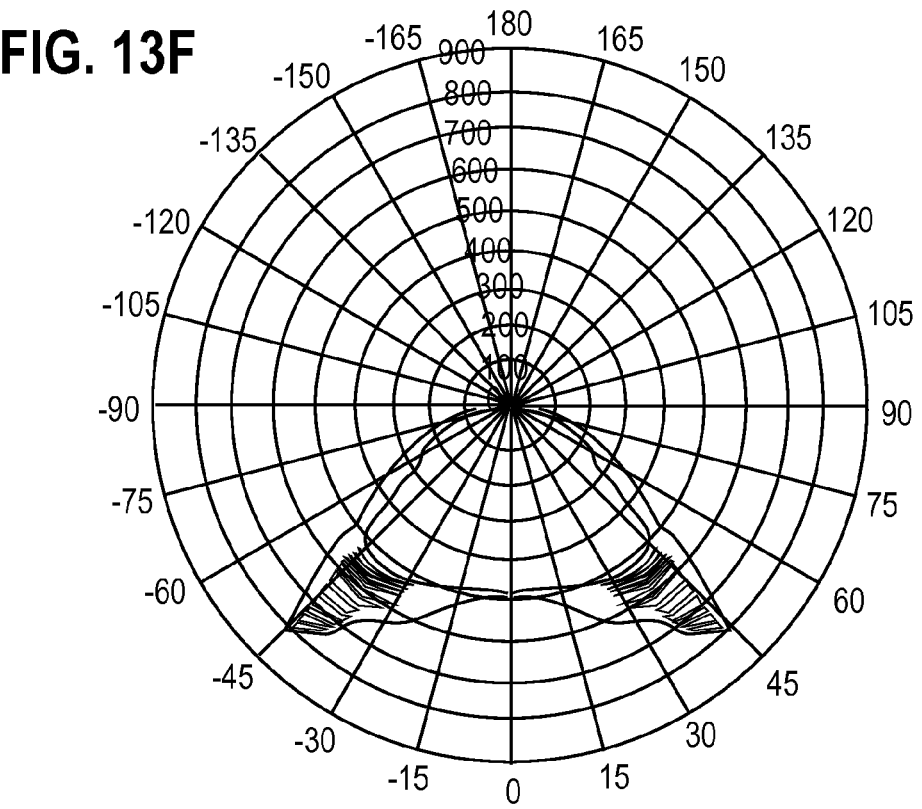
Figure 13G:
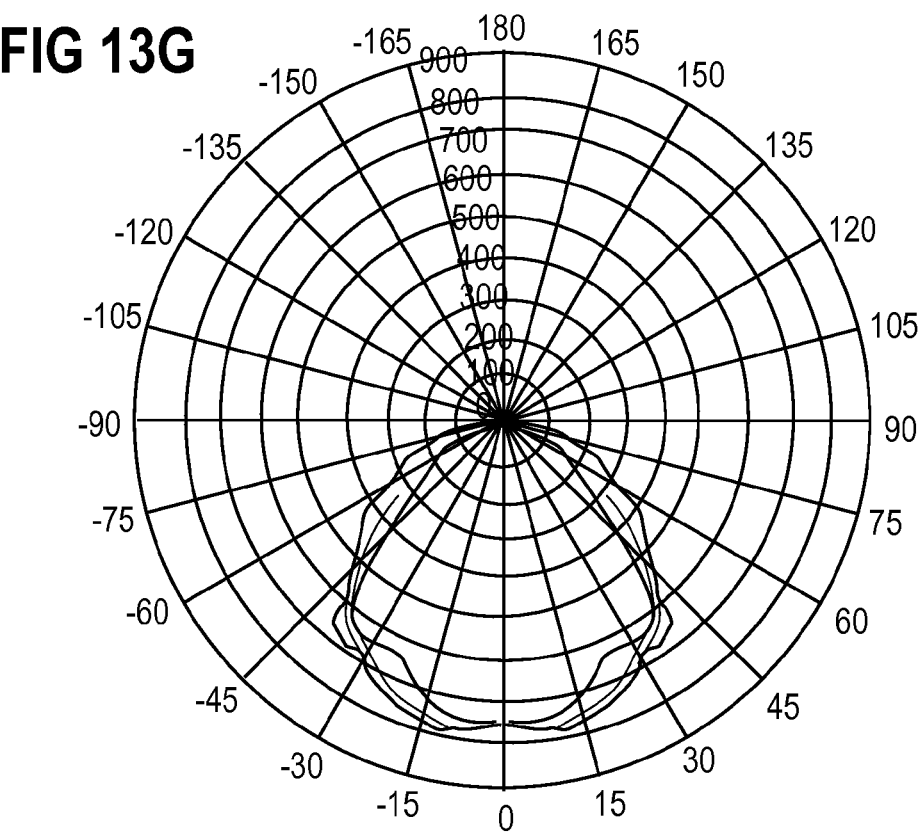
Figure 13H:
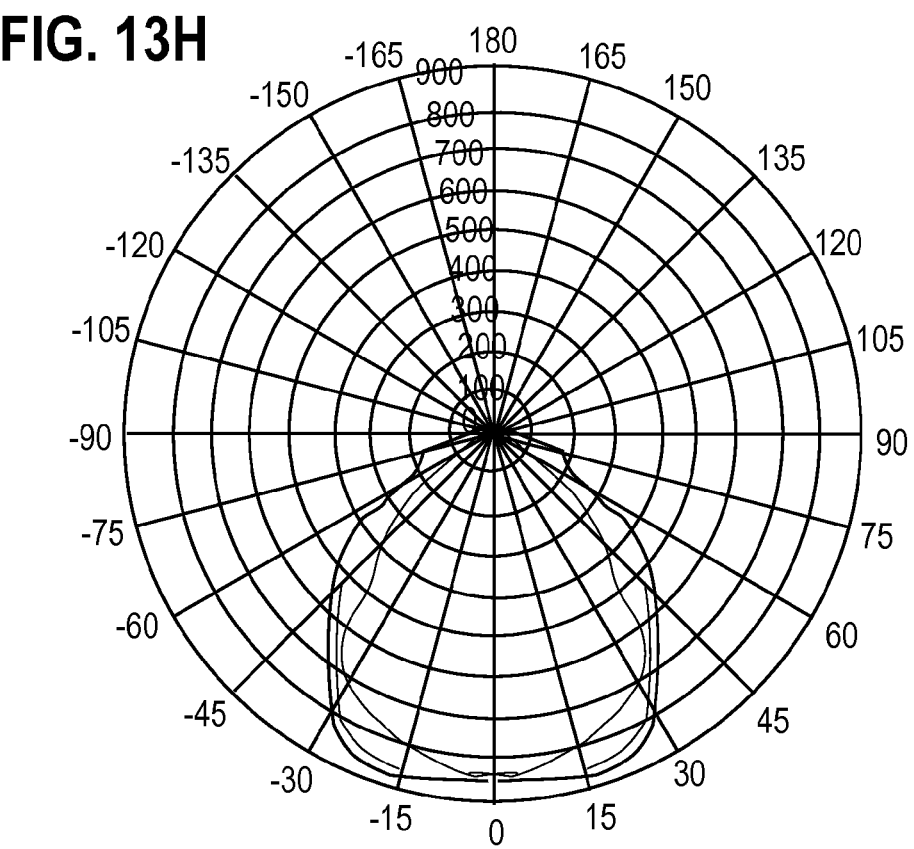
Figure 13I:
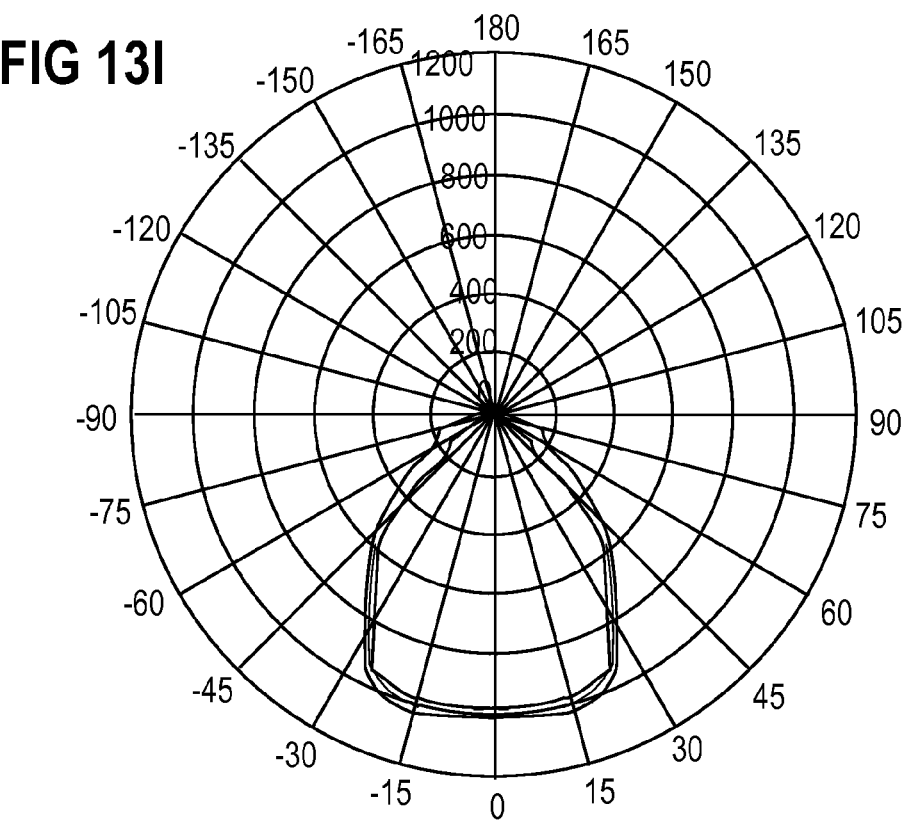
Figure 13J:
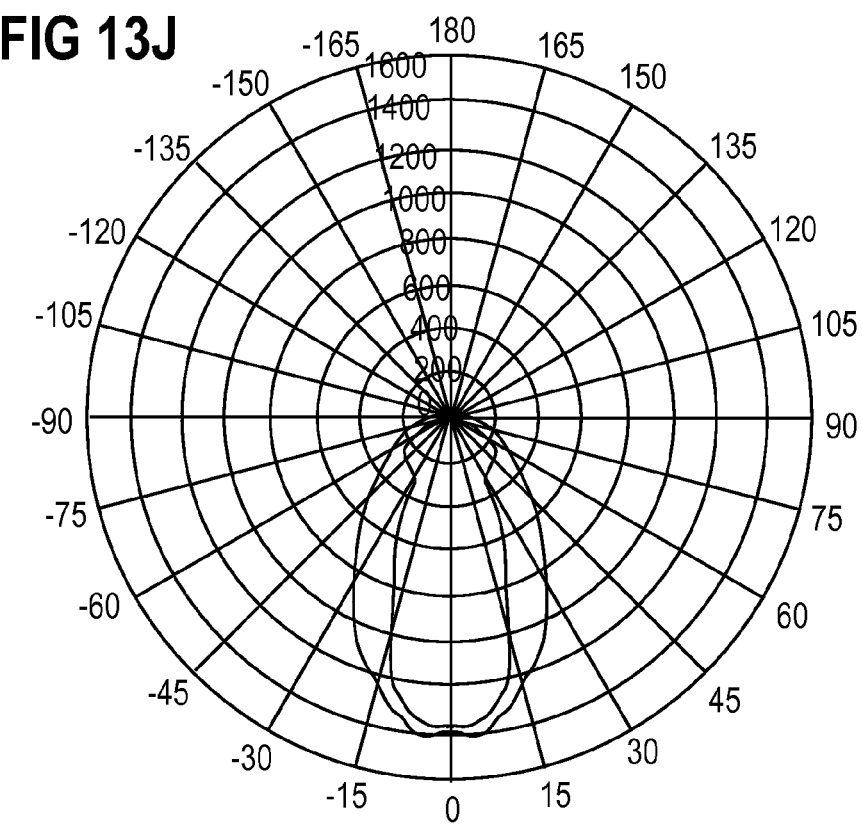

The height(s) of the light extraction elements 34 affect the distribution of the light illumination of the waveguide 50. As seen in FIGS. 13A-13J, a waveguide 50 that has light extraction elements 34 disposed thereon produces an illumination distribution that varies with the height of the light extraction element (the illumination distribution shown in FIGS. 13A-13J assume that the light extraction elements 34 of the same extraction film 30 are all of substantially the same height). The illumination pattern of FIG. 13A is provided with an extraction film having a light extraction element height of 132 micrometers. The pattern of FIG. 13B is provided with a light extraction element height of 181 micrometers; FIG. 13C at a height of 230 micrometers; FIG. 13D at a height of 279 micrometers; FIG. 13E at a height of 328 micrometers; FIG. 13F at a height of 378 micrometers; FIG. 13G at a height of 427 micrometers; FIG. 13H at a height of 476 micrometers; FIG. 13I at a height of 525 micrometers; and FIG. 13J at a height of 574 micrometers. As seen, the illuminance distribution varies from a "wallwash" distribution (i.e., a distribution having significant side-to-side illumination component) at light extractor heights of about 279 micrometers in FIG. 13D, to a nearly Lambertian distribution at light extractor heights of about 427 micrometers in FIG. 13G, to a more collimated downlight or spot distribution at light extractor heights of about 574 micrometers in FIG. 13J. Generally, the illumination variances are due to variations in optical coupling surface area and light extraction aperture area between flat surface 42 of the undercut light extraction elements 34 and waveguide body 52 as the cross-sectional dimensions of the light extraction elements vary with height. The undercut light extraction elements provide a wide range of illuminance distributions by varying the gap between the lenticular film base and the surface of the waveguide body.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. A lighting device, comprising:
a first waveguide body arm comprising a first portion and a second portion disposed at a non-zero angle with respect to the first portion;
a second waveguide body arm comprising a third portion and a fourth portion disposed at the non-zero angle with respect to the third portion, wherein a coupling cavity is defined between the second portion and the fourth portion;
a first film disposed on a first surface of the first portion of the first waveguide body arm, wherein the first film comprises a first base and a first plurality of undercut light extraction elements disposed between the first base and the first surface, and wherein each of at least some of the first plurality of undercut light extraction elements comprises a first cross sectional curved shape;
a second film disposed on a third surface of the third portion of the second waveguide body arm, wherein the second film comprises a second base and a second plurality of undercut light extraction elements disposed between the second base and the third surface, and wherein each of at least some of the second plurality of undercut light extraction elements comprises a second cross sectional curved shape; and
a light source disposed adjacent to the second portion and the fourth portion such that light from the light source is totally internally reflected through the second portion and the fourth portion into the first portion and the third portion, respectively, and the light is extracted via the first plurality of undercut light extraction elements and the second plurality of undercut light extraction elements, respectively.

2. The lighting device of claim 1, wherein the first plurality and the second plurality of undercut light extraction elements are disposed in hexagonal arrays.

3. The lighting device of claim 1, wherein the first and second cross sectional curved shapes are hemispherical.

4. The lighting device of claim 1, wherein the first and second waveguide body arms and the first and second films are made of the same material.

5. The lighting device of claim 1, further comprising a first reflector disposed adjacent a second surface of the first portion of the first waveguide body arm opposite the first surface and a second reflector disposed adjacent a fourth surface of the third portion of the second waveguide body arm opposite the third surface.

6. The lighting device of claim 1, further comprising a third plurality of undercut light extraction elements disposed on a second surface of the first portion opposite the first surface and a fourth plurality of undercut light extraction elements disposed on a fourth surface of the third portion opposite the third surface.

7. The lighting device of claim 1, wherein all of the first and second plurality of undercut light extraction elements comprise substantially the same height.

8. The lighting device of claim 7, wherein each of the first and second bases comprises a constant thickness.

9. The lighting device of claim 8, wherein each of the first and second plurality of undercut light extraction elements comprises a truncated shape and the height of each of the first and second plurality of undercut light extraction elements is within a range of 100 micrometers to 590 micrometers and the thickness of each of the first and second bases is about 500 micrometers.

10. The lighting device of claim 1, wherein the first and second plurality of undercut light extraction elements each comprises a truncated cross sectional shape.

11. The lighting device of claim 10, wherein the truncated cross sectional shape is hemispherical.

12. The lighting device of claim 1, wherein the first and second waveguide body arms and the first and second films are made of different materials.

13. The lighting device of claim 1, wherein each of the first and second plurality of undercut light extraction elements comprises a first cross sectional dimension proximal the first and second bases, respectively, and a second cross sectional dimension smaller than the first cross sectional dimension distal from the first and second bases, respectively.

14. A lighting device, comprising:
a waveguide body comprising a first surface and a second surface opposite the first surface;
a film disposed on the first surface of the waveguide body wherein the film comprises a base and a plurality of undercut light extraction elements disposed in a pattern between the base and the first surface, wherein each of at least some of the plurality of undercut light extraction elements comprises a cross sectional curved shape and the at least some of the plurality of undercut light extraction elements are distributed in adjacent rows; and
wherein a first distance dy between a first centerpoint of a first undercut light extraction element in a first row to a bisector point comprising a midpoint between a second centerpoint of a second undercut light extraction element and an adjacent third centerpoint of a third undercut light extraction element in a second row adjacent the first row is defined by an equation comprising $$(dy) = ((dx) \times \sqrt{3})/2$$

wherein dx is a second distance between the second centerpoint of the second undercut light extraction element and the third centerpoint of the third undercut light extraction element.

15. The lighting device of claim 14, wherein each of at least some of the plurality of undercut light extraction elements comprises a first cross sectional dimension proximal the base and a second cross sectional dimension smaller than the first cross sectional dimension distal from the base and further comprise substantially the same height.

16. The lighting device of claim 15, wherein each undercut light extraction element comprises a truncated curved shape.

17. The lighting device of claim 16, wherein the curved shape is hemispherical.

18. The lighting device of claim 14, wherein the plurality of undercut light extraction elements is disposed in a hexagonal array.

19. The lighting device of claim 14, further comprising a reflector disposed adjacent the second surface opposite the first surface.

20. The lighting device of claim 14, wherein each light extraction element comprises a truncated shape and each light extraction element comprise substantially the same height within a range of 100 micrometers to 590 micrometers and the thickness of the base is about 500 micrometers.

* * * * *